US005973800A

United States Patent [19]

Usui et al.

[11] Patent Number: 5,973,800

[45] Date of Patent: Oct. 26, 1999

[54] METHOD AND APPARATUS FOR SIMULATING COLOR PRINT

[75] Inventors: Nobuaki Usui, Tokyo; Atsushi Imamura, Kyoto, both of Japan

[73] Assignee: Dainippon Screen Manufacturing Co., Ltd., Japan

[21] Appl. No.: 08/883,799

[22] Filed: Jun. 27, 1997

[30] Foreign Application Priority Data

Jun. 28, 1996 [JP] Japan .................................... 8-188372

[51] Int. Cl.[6] ........................................................ H04N 1/46

[52] U.S. Cl. .......................... 358/509; 358/501; 358/504; 356/402

[58] Field of Search ..................................... 358/501, 502, 358/503, 504, 500, 509, 512, 520, 515, 518; 382/162, 167; 356/300, 302, 303, 308, 319, 334, 402, 407, 425

[56] References Cited

U.S. PATENT DOCUMENTS

| | | | |
|---|---|---|---|
| 4,905,039 | 2/1990 | Terashita | 355/35 |
| 5,272,518 | 12/1993 | Vincent | 358/405 |
| 5,408,447 | 4/1995 | Cottrell et al. | 358/509 |
| 5,485,556 | 1/1996 | Takagi et al. | 395/126 |
| 5,596,425 | 1/1997 | Usui et al. | 358/500 |

FOREIGN PATENT DOCUMENTS 0669754 8/1995 European Pat. Off. .

OTHER PUBLICATIONS

Balasubramanian, Raja, *Institute of Electrical and Electronics Engineers*, Proceedings of the International Conference on Image Processing (ICIP), "Colorimetric Modeling of Binary Color Printers," Washington, Oct. 23–26, 1995, vol. 2, Oct. 23, 1995, pp. 327–330.

*Primary Examiner*—Edward L. Coles
*Assistant Examiner*—Madeleine AV Nguyen
*Attorney, Agent, or Firm*—Ostrolenk, Faber, Gerb & Soffen, LLP

[57] ABSTRACT

An illuminance spectrum I of reflected light from a color print of an N-order color having an arbitrary dot percent $d_{1-N}$ is defined by a diffuse reflection coefficient $Sb(d_{1-N},\lambda)$ and a specular reflection coefficient $Ss(d_{1-N},\lambda)$. These reflection coefficients are obtained in the following manner. A plurality of reference colors are specified on each of $N\times 2^{(N-1)}$ sides that constitute an N-dimensional color space including the N-order target color. Each reflection coefficient is expressed by a linear combination of a plurality of reference reflection coefficients Sb and Ss, which are set in advance for the plurality of reference colors. The illuminance spectrum of reflected light is then determined according to these reflection coefficients Sb and Ss. Color data representing the colors of the print in a colorimetric system suitable for an output device are subsequently generated from the illuminance spectrum.

13 Claims, 21 Drawing Sheets

Fig. 3(A) PRIMARY COLOR
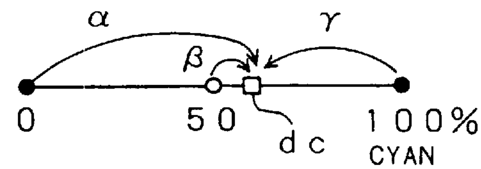
Fig. 3(B) SECONDARY COLOR
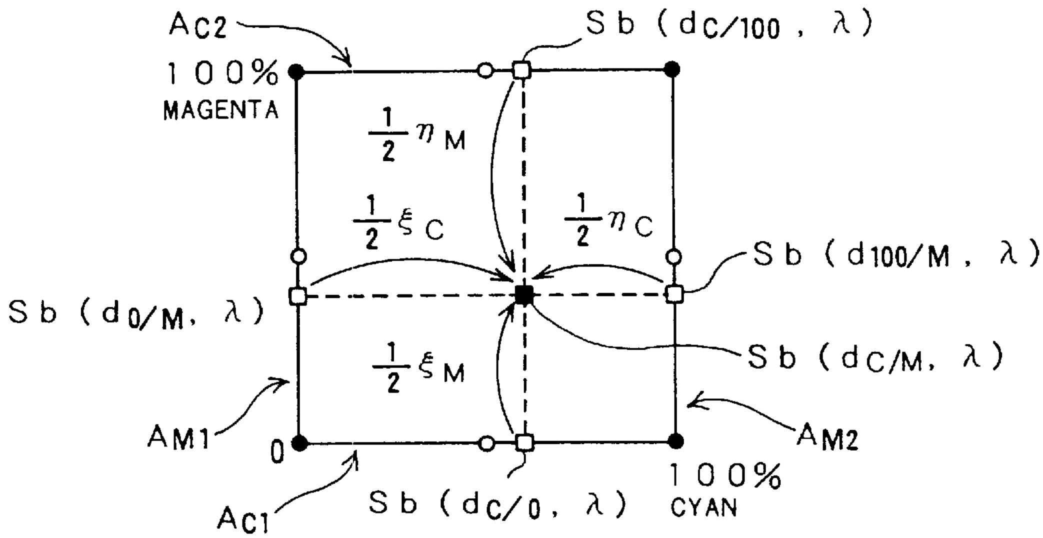
Fig. 3(C) TERTIARY COLOR
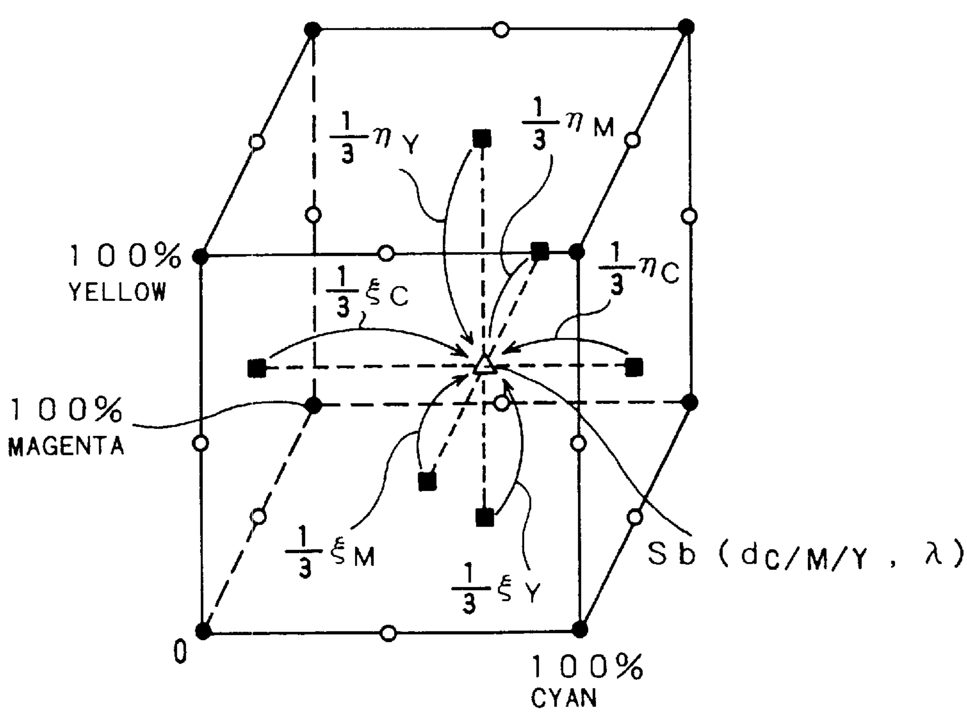

Fig. 8 (A) GRADATION (11 COLOR CHIPS)

| | | | | | | | | | | |
|---|---|---|---|---|---|---|---|---|---|---|
| 0 % | 10 | 20 | 30 | 40 | 50 | 60 | 70 | 80 | 90 | 100 % |

Fig. 8 (B) MEASUREMENT CONDITIONS OF SPECTRAL REFLECTIVITY (FOR EACH COLOR CHIP)

| θ \ ρ | −10° | −8° | | | −2° | 0° | 2° | | | 34° | 35° |
|---|---|---|---|---|---|---|---|---|---|---|---|
| 8° | ○ | ○ | | | ○ | ○ | ○ | | | ○ | ○ |
| 10° | ○ | ○ | | | ○ | ○ | ○ | | | ○ | ○ |

Fig. 8 (C) MEASUREMENT OF SPECTRAL REFLECTIVITY (UNDER EACH CONDITION)

Fig. 11(A) SPECTRAL REFLECTIVITY (FIG. 10)
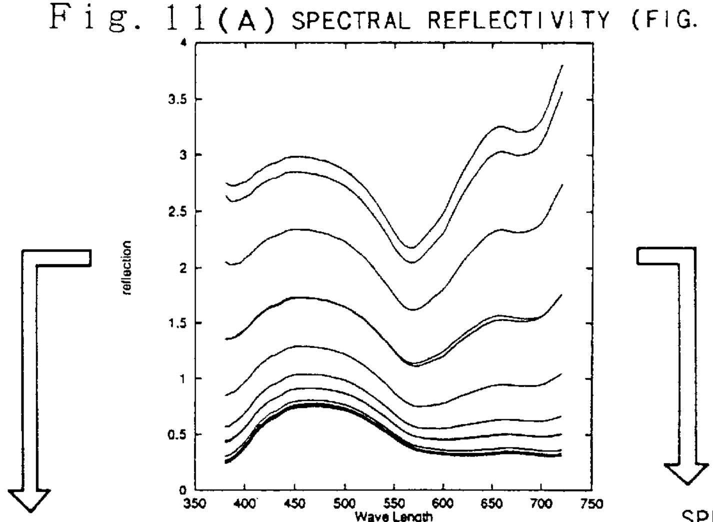
Fig. 11(B) DIFFUSE REFLECTION COMPONENT (FIG. 12)
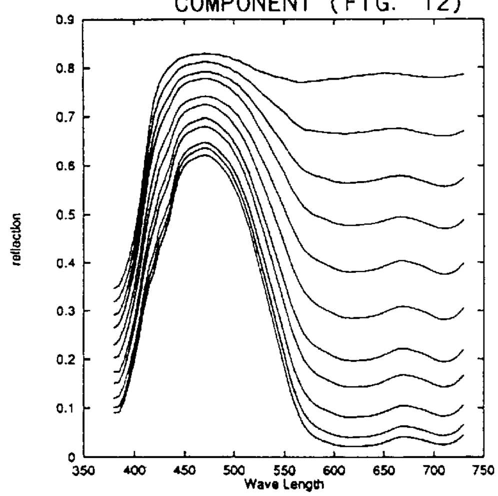
Fig. 11(C) SPECULAR REFLECTION COMPONENT (FIG. 13)
((A) − (B))
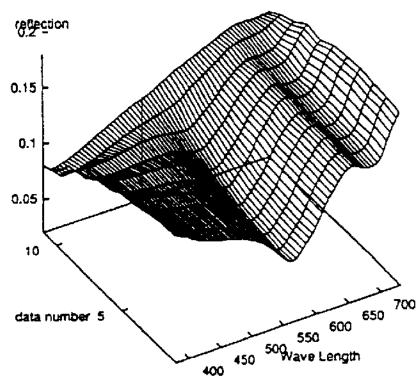
Fig. 11(D) WEIGHTING COEFFICIENTS(FIG. 14)
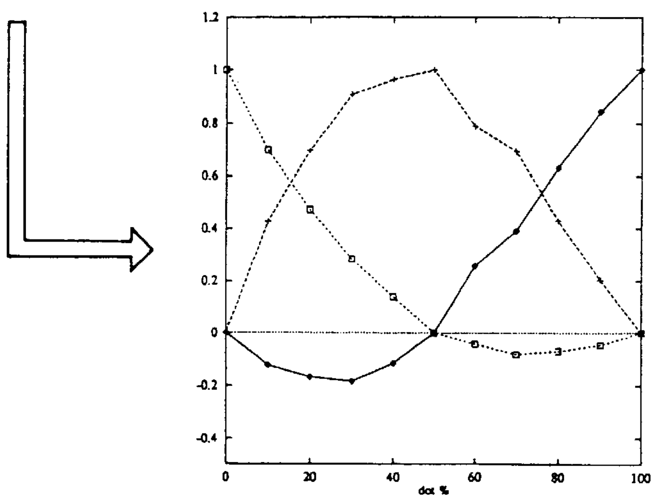

ESTIMATION OF SPECULAR REFLECTION COMPONENT Ss(d, λ)

COMPARISON BETWEEN MEASURED VALUES OF DIFFUSE REFLECTION COMPONENT Sb(d, λ) · cos θ (SOLID LINES) AND RESULTS OF SIMULATION (BROKEN LINES)

Fig. 16(A) COORDINATE SYSTEM OF DOT PERCENT
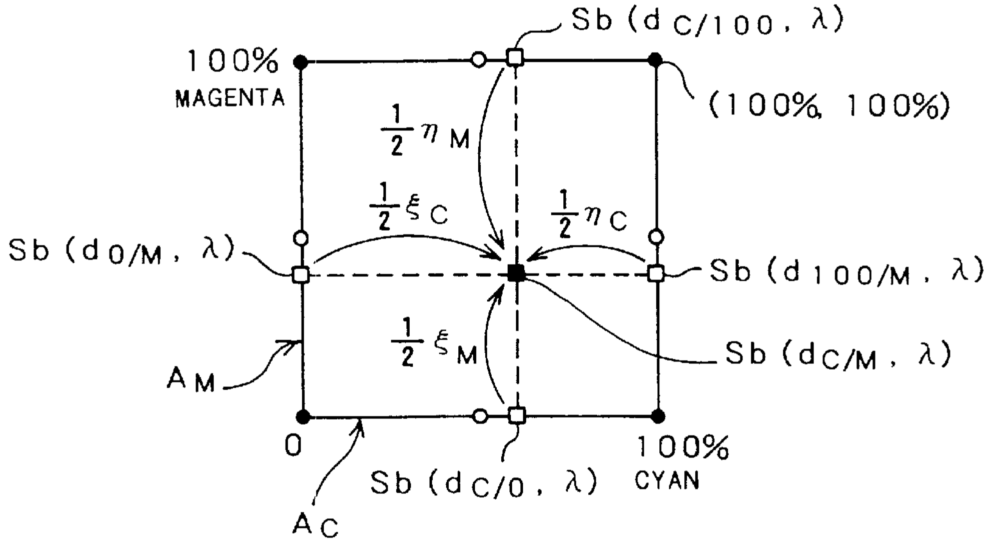
Fig. 16(B)
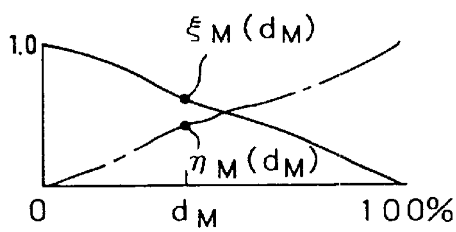
Fig. 16(C)
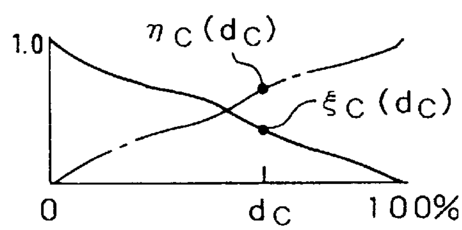
Fig. 16(D) CORRECTION COORDINATE SYSTEM
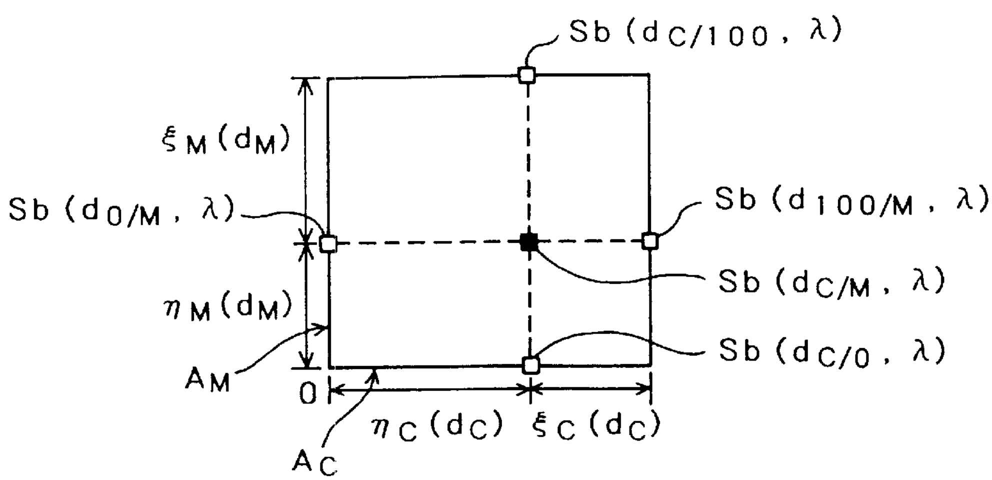

COMPARISON BETWEEN MEASURED VALUES OF DIFFUSE REFLECTION COMPONENT Sb(d, λ) · cos θ (SOLID LINES) REGARDING SECONDARY COLOR AND RESULTS OF SIMULATION (BROKEN LINES)

SIMPLIFIED WEIGHTING COEFFICIENTS $\alpha(d)$, $\beta(d)$, $\gamma(d)$

METHOD AND APPARATUS FOR SIMULATING COLOR PRINT

BACKGROUND OF THE INVENTION

1. Field of the Invention

The present invention relates to a technique of reproducing color prints with an output device, such as a display device or a printer.

2. Description of the Related Art

In reproducing a color print with a variety of output devices including a display device and a printer, it is desirable to reproduce colors closest possible to those of the actual color print. The conventional method of reproducing colors of a print utilizes a known equation, such as Marley-Davis's Equation, Jule-Nielsen's Equation, or Neugebauer's Equation. For example, Neugebauer's Equation is used to calculate the values of color components R, G, and B from the dot percents of four color inks Y. M, C, and K.

The known conversion equations are, however, based on an ideal model and can not reproduce the actual colors in many cases. Especially, no model is applicable for simulating observation of a print arranged in a three-dimensional space.

The applicant of the present invention has proposed a method of reproducing a print arranged in a three-dimensional space, as disclosed in U.S. Pat. No. 5,596,425. This proposed method determines an illuminance spectrum I(θ, ρ, λ) of reflected light from a color print according to a specular reflection coefficient Ss(λ) and an internal reflection coefficient Sb(λ), and displays the color print based on the illuminance spectrum I(θ, ρ, λ), where θ denotes an angle of reflection, ρ denotes an angle of deviation, and λ denotes a wavelength. This method can faithfully reproduce a print having a specific dot percent, such as 100%, of a single primary color, but its applicability was not clear to the faithful reproduction of a color print having an arbitrary dot percent or a color print that is printed in a plurality of inks.

SUMMARY OF THE INVENTION

Accordingly, an object of the present invention is to provide a technique for reproducing an image portion having an arbitrary dot percent included in a color print, which is printed in a plurality of inks and arranged in a three-dimensional space, with a higher accuracy.

In order to attain at least partly the above and other objects of the present invention, there is provided a method of simulating a color print of an N-order color, where N is an integer of at least 2, arranged in a three-dimensional space by rendering the color print and thereby reproducing the color print with an output device. The method uses an illuminance spectrum I of a reflected light beam, which is observed at a predetermined observation point when a target point on the color print is irradiated with a light beam having a predetermined luminance spectrum φ. The illuminance spectrum I is given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

where $d_{1-N}$ denotes a dot percent of each of N different color inks at the target point, λ denotes a wavelength of the light beam, $Sb(d_{1-N}, \lambda)$ and $Ss(d_{1-N},\lambda)$ respectively denote a first reflection coefficient and a second reflection coefficient for the N-order color, θ denotes an angle of reflection, fb(θ) denotes a θ-dependent characteristic, ρ denotes an angle of deviation of an observing direction from a reflecting direction of the light beam, fs(ρ) denotes a ρ-dependent characteristic, and Ie(λ) represents an illuminance spectrum of ambient light observed at the observation point. The method comprises the st of: (a) specifing a plurality of reference colors on each of $N\times2^{(N-1)}$ sides that constitute an N-dimensional color space including a target color of the target point, the target color being the N-order color, and providing first and second reference reflection coefficients for each of the plurality of reference colors; determining a first reflection coefficient Sb in the Equation defining illuminance spectrum I by a linear combination of a plurality of first reference reflection coefficients preset for the plurality of reference colors, and determining a second reflection coefficient Ss by a linear combination of a plurality of second reference reflection coefficients preset for the plurality of reference colors. The method further comprises the steps of (b) determining the illuminance spectrum I of the reflected light beam according to the Equation using the first reflection coefficient Sb and the second reflection coefficient Ss determined in the step (a); and (c) obtaining color data representing the target color in a colorimetric system suitable for the output device from the illuminance spectrum I of the reflected light beam.

The illuminance spectrum $I(d_{1-N}, \theta,\rho,\lambda)$ for the N-order target color having an arbitrary dot percent $d_{1-N}$ can be determined according to the above method, and it is then converted to color data in the colorimetric system of the output device. This accordingly enables an image portion of an arbitrary dot percent included in a color print of the N-order color arranged in a three-dimensional space to be reproduced with a higher accuracy.

In a preferred embodiment, the plurality of reference colors on each of the $N\times2^{(N-1)}$ sides include at least colors at end points of each side. The plurality of reference colors on each of the $N\times2^{(N-1)}$ sides further include a color at a substantial center of each side.

Preferably, the step (a) comprises the steps of: (1) specifying 2n pieces of pseudo-(n−1)-order colors by projecting a coordinate point of an n-order color, where n is an integer of at least 2 and not greater than N, on 2n pieces of (n−1)-order color spaces which constitute the periphery of an n-order color space including the n-order color; determining the first reflection coefficient Sb with respect to the n-order color by a linear combination of first reflection coefficients with respect to the 2n pieces of pseudo-(n−1)-order colors, and determining the second reflection coefficient Ss with respect to the n-order color by a linear combination of second reflection coefficients with respect to the 2n pieces of pseudo-(n−1)-order colors; and (2) repeating the step (1) while changing the n from 2 to N, thereby obtaining the first reflection coefficient Sb and the second reflection coefficient Ss with respect to the N-order color.

This procedure determines the reflection coefficients Sb and Ss with respect to the n-order color in a stepwise manner, thereby eventually determining the reflection coefficients Sb and Ss with respect to the N-order target color.

In another preferred embodiment, the step (a) further comprises the steps of: specifying $N\times2^{(N-1)}$ pieces of pseudo-primary colors by projecting a coordinate point of the N-order target color on the $N\times2^{(N-1)}$ sides constituting the N-order color space; determining a first reflection coefficient Sb with respect to each of the $N\times2^{(N-1)}$ pieces of pseudo-primary colors by a linear combination of the plurality of first reference reflection coefficients with respect to the reference colors on each of the $N\times2^{(N-1)}$ sides; and determining a second reflection coefficient Ss with respect to each of the $N\times2^{(N-1)}$ pieces of pseudo-primary colors by a linear combination of the plurality of second reference reflection coefficients with respect to the reference colors on each of the $N\times2^{(N-1)}$ sides.

Preferably, the characteristics fb(θ) and fs(ρ) are give by:

$fb(\theta)=\cos\theta$ $fs(\rho)=e^{-\sigma\rho^2}$ where σ is a constant.

According to an aspect of the present invention, there is provided an apparatus for simulating a color print of an N-order color, where N is an integer of at least 2, arranged in a three-dimensional space by rendering the color print to reproduce the color print with an output device. The apparatus comprises: reflection coefficients determining means for (i) specifying a plurality of reference colors on each of $N\times2^{(N-1)}$ sides that constitute an N-dimensional color space including a target color of the target point, the target color being the N-order color, and providing first and second reference reflection coefficients for each of the plurality of reference colors; (ii) determining a first reflection coefficient Sb in the Equation defining the illuminance stectrum I by a linear combination of a plurality of first reference reflection coefficients preset for the plurality of reference colors, and (iii) determining a second reflection coefficient Ss by a linear combination of a plurality of second reference reflection coefficients preset for the plurality of reference colors. The apparatus further comprises means for determining the illuminance spectrum I of the reflected light beam according to the Equation using the first reflection coefficient Sb and the second reflection coefficient Ss determined by the reflection coefficients determining means; and means for obtaining color data representing the target color in a colorimetric system suitable for the output device from the illuminance spectrum I of the reflected light beam.

In another aspect, the present invention provides a computer program product for simulating a color print of an N-order color, where N is an integer of at least 2, arranged in a three-dimensional space by rendering the color print to reproduce the color print with an output device. The computer program product comprising: a computer readable medium; and a computer program code means stored on the computer readable medium, for causing a computer to implement the above steps or the above means.

These and other objects, features, aspects, and advantages of the present invention will become more apparent from the following detailed description of the preferred embodiments with the accompanying drawings.

BRIEF DESCRIPTION OF THE DRAWINGS

FIGS. 3(A)–3(C) show a process of determining reflection coefficients for the primary color, the secondary color, and the tertiary color;

FIGS. 11(A)–11(D) show a process of determining the diffuse reflection components and the specular reflection components based on the spectral reflectivities and subsequently determining the weighting coefficients α, β, and γ;

FIGS. 16(A)–16(D) show a method of determining the reflection coefficients for the secondary color;

DESCRIPTION OF THE PREFERRED EMBODIMENT

A. Outline of the Process of Creating Color Data

Figure 1:
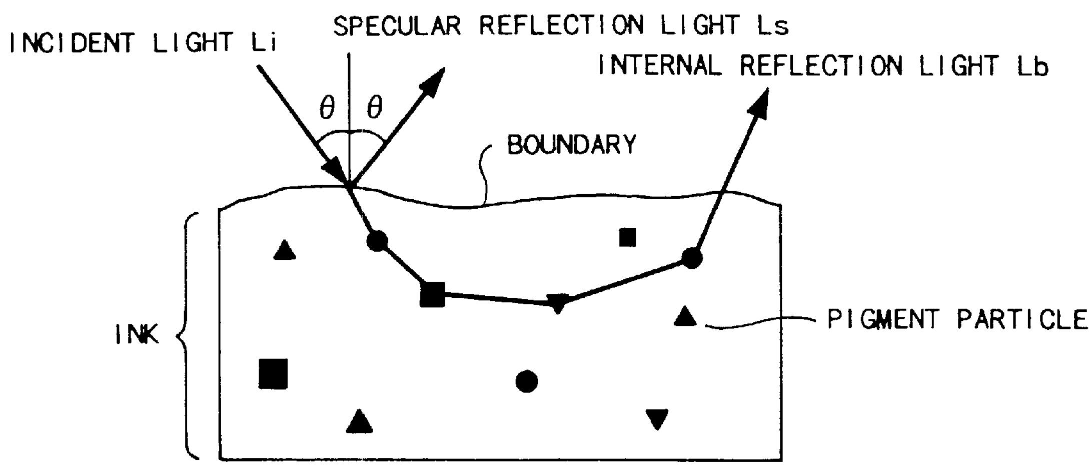
FIG. 1 illustrates a process of reflecting an incident light beam from an ink applied on a printing sheet.

FIG. 1 illustrates a process of reflecting incident light from an ink applied on a printing sheet. Referring to FIG. 1, an incident light beam Li to an ink is reflected by two different pathways. A first reflected light beam is a specular reflection light beam Ls reflected from a boundary between the surface of the ink and an air layer. A second reflected light beam is a diffuse reflected light beam Lb (also referred to as 'internal reflection light beam'), which passes through the surface of the ink, scattered by the ink and particles in the sheet, and eventually goes outside.

Figure 2:
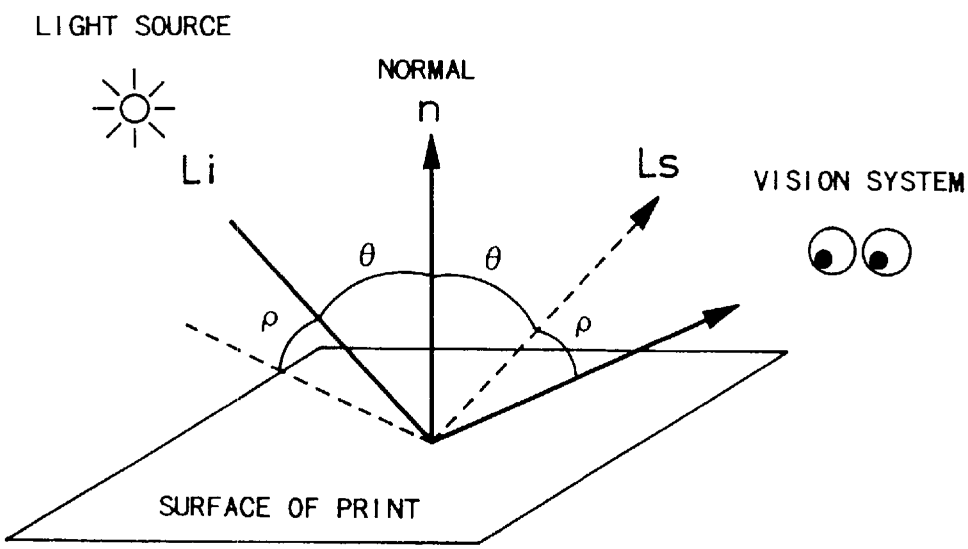
FIG. 2 shows the relationship between a light source, a print, and a vision system.

FIG. 2 shows the relationship between a light source, a print, and a vision system (observer). Referring to FIG. 2, the position of the vision system is generally deviated from the direction of the specular reflection light beam Ls by an angle ρ (hereinafter referred to as the angle of deviation). The direction from a reflection point of the light beam on the surface of the print toward the vision system (that is, the direction of observation) may not exist on a specific plane including the incident light beam Li and the specular reflection light beam Ls. Even in this case, the angle of the specular reflection light beam Ls and the direction of observation is defined by the angle of deviation ρ.

In the drawing of FIG. 2, the illuminance of the reflected light observed by the observer can be expressed as a linear combination of the illuminance of the specular reflection light beam Ls, the illuminance of the diffuse reflected light beam Lb, and the illuminance of ambient light, by the following Equation (1):

$$I(\theta,\rho,\lambda)=Ib(\theta,\lambda)+Is(\rho,\lambda)+Ie(\lambda) \tag{1}$$

wherein $\lambda$ denotes a wavelength of a light beam, $I(\theta, \rho, \lambda)$ denotes an illuminance spectrum of a reflected light beam observed, $Ib(\theta, \rho, \lambda)$ denotes an illuminance spectrum of the diffuse reflected light beam Lb, $Is(\theta, \rho, \lambda)$ denotes an illuminance spectrum of the specular reflection light beam, and $Ie(\lambda)$ denotes an illuminance spectrum of ambient light. The illuminance spectra $I(\theta, \rho, \lambda)$, $Is(\theta, \rho, \lambda)$, and $Ib(\theta, \rho, \lambda)$ depend upon an angle of reflection $\theta$, the angle of deviation $\rho$, and the wavelength $\lambda$. The illuminance spectrum $Ie(\lambda)$ of ambient light is an element attributable to the ambient light observed at an observation point and including light from a standard light source and natural light. The illuminance spectrum $Ie(\lambda)$ of ambient light does not depend upon the angle of reflection $\theta$ or the angle of deviation $\rho$, but depends upon only the wavelength $\lambda$.

Assuming that the illuminance spectra $Is(\theta, \rho, \lambda)$, and $Ib(\theta, \rho, \lambda)$ included in Equation (1) are respectively divided into an angular element and a wavelength element as defined by Equations (2a) and (2b) given below, Equation (1) can be rewritten as Equation (3):

$$Ib(\theta,\lambda)=Sb(\lambda)\cdot fb(\theta)\cdot\phi(\lambda) \tag{2a}$$

$$Is(\rho,\lambda)=Ss(\lambda)\cdot fs(\rho)\cdot\phi(\lambda) \tag{2b}$$

$$I(\theta,\rho,\lambda)=\{Sb(\lambda)\cdot fb(\theta)+Ss(\lambda)\cdot fs(\rho)\}\cdot\phi(\lambda)+Ie(\lambda) \tag{3}$$

wherein $Sb(\lambda)$ denotes a diffuse reflection coefficient, $Ss(\lambda)$ denotes a specular reflection coefficient, and $\phi(\lambda)$ denotes a luminance spectrum of the incident light beam.

As is known, an angle-dependent characteristic $fb(\theta)$ of the diffuse reflected light beam Lb is expressed by $\cos\theta$. The illuminance of the specular reflection light beam Ls reaches its maximum on observation in the reflecting direction along the angle of reflection $\theta$ (that is, the direction of $\theta=0°$, and abruptly decreases with a deviation from the reflecting direction. A characteristic $fs(\rho)$ included in Equation (3) represents this phenomenon. It is accordingly thought that the function $fs(\rho)$ represents the characteristic that is equal to one when $\rho=0$ and abruptly decreases in a monotonic manner with an increase in $\rho$ in the range of $0\leqq\rho\leqq 90°$. As is known, for example, the $n_o$-th power of $\cos\theta$ ($n_o$ is a constant experimentally determined) may be used as the characteristic $fs(\rho)$. In this embodiment, however, the functional form of the characteristic $fs(\rho)$ is determined based on the measurement of reflected light as discussed below.

Equation (3) given above does not take into account the dot percents of the color print. In the description below, it is assumed that the color print is printed in four primary color inks, C (cyan), M (magenta), Y (yellow), and K (black) and that the dot percents of the four color inks are defined as $(d_C,d_M,d_Y,d_K)$. The symbol '$d_{C/M/Y/K}$' in the following description represents the dot percents of the four color inks, C, M, Y, and K. In the right-hand side of Equation (3), only the diffuse reflection coefficient Sb and the specular reflection coefficient Ss depend upon the dot percents $d_{C/M/Y/K}$. Equation (3) is accordingly rewritten as Equation (4) given below:

$$I(d_{C/M/Y/K},\theta,\rho,\lambda)=\{Sb(d_{C/M/Y/K},\lambda)\cdot\cos\theta+Ss(d_{C/M/Y/K},\lambda)\cdot fs(\rho)\}\cdot\phi(\lambda)+Ie(\lambda) \tag{4}$$

When an illuminance spectrum $I(d_{C/M/Y/K},\theta,\rho,\lambda)$ of the reflected light is obtained for a printed area having the dot percents of $d_{C/M/Y/K}$, three stimulus values $X(d_{C/M/Y/K})$, $Y(d_{C/M/Y/K})$, and $Z(d_{C/M/Y/K})$ in the CIE-XYZ calorimetric system are defined by Equations (5a)–(5c) given below according to the definition:

$$X(d_{C/M/Y/K})=k\int_{380}^{720}I(d_{C/M/Y/K},\theta,\rho,\lambda)\cdot\bar{x}(\lambda)d\lambda \tag{5 a}$$

$$Y(d_{C/M/Y/K})=k\int_{380}^{720}I(d_{C/M/Y/K},\theta,\rho,\lambda)\cdot\bar{y}(\lambda)d\lambda \tag{5 b}$$

$$Z(d_{C/M/Y/K})=k\int_{380}^{720}I(d_{C/M/Y/K},\theta,\rho,\lambda)\cdot\bar{z}(\lambda)d\lambda \tag{5 c}$$

wherein $x(\lambda)$, $y(\lambda)$, and $z(\lambda)$ denote isochromatic functions. As a matter of convenience, bars above the letters x, y, and z are omitted in the text except Equations.

Conversion of the three stimulus values $X(d_{C/M/Y/K})$, $Y(d_{C/M/Y/K})$, and $Z(d_{C/M/Y/K})$ obtained according to Equations (5a)–(5c) or chromaticity coordinates thereof (x,y,z) into color data in a colorimetric system of the output device (for example, RGB colorimetric system) enables colors of the printed area having the dot percents of $d_{C/M/Y/K}$ to be faithfully reproduced by the output device.

Equation (4) given above is readily expandable to general prints in N different color inks. In this specification, the symbol '$d_{1-N}$' denotes dot percents of N different color inks. General Equation (6) is obtained by replacing the symbol $d_{C/M/Y/K}$ in Equation (4) by the symbol $d_{1-N}$:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda) \tag{6}$$

The following description primarily refers to the case in which Equation (4) is applied (that is, the case in which a print in four color inks C, Y, M, and K is reproduced). In the specification, a color reproduced with N different color inks is referred to as 'N-order color'.

The illuminance spectrum $Ie(\lambda)$ of the ambient light, which is the third term in the right-hand side of Equation (4), is set to a fixed value according to the observation environment of the color print. Determination of the terms other than the illuminance spectrum $Ie(\lambda)$ of the ambient light in Equation (4) will give the illuminance spectrum I of the reflected light in an arbitrary observation environment. The following describes a process of determining the illuminance spectrum I of the reflected light when the illuminance spectrum $Ie(\lambda)$ of the ambient light is equal to zero.

Upon condition that the illuminance spectrum $Ie(\lambda)$ of the ambient light is equal to zero, Equation (4) is rewritten as Equation (7) given below:

$$I(d_{C/M/Y/K},\theta,\rho,\lambda)=Ib(d_{C/M/Y/K},\theta,\lambda)+Is(d_{C/M/Y/K},\rho,\lambda)=\{Sb(d_{C/M/Y/K},\lambda)\cdot\cos\theta+Ss(d_{C/M/Y/K},\lambda)\cdot fs(\rho)\}\cdot\phi(\lambda) \tag{7}$$

What is to be known here is the diffuse reflection coefficient $Sb(d_{C/M/Y/K},\lambda)$ and the specular reflection coefficient $Ss(d_{C/M/Y/K},\lambda)$ at the dot percent$d_{C/M/Y/K}$ and a concrete form of the characteristic $fs(\rho)$ depending upon the angle of deviation $\rho$. Determination of the form of the characteristic $fs(\rho)$ will be discussed later. The following refers to the outline of the process of determining the diffuse reflection coefficient $Sb(d_{C/M/Y/K},\lambda)$ and the specular reflection coefficient $Ss(d_{C/M/Y/K},\lambda)$ at the dot percent $d_{C/M/Y/K}$.

B. Outline of the Process of Determining Reflection Coefficients for the N-order Color FIGS. 3(A)–3(C) show a process of determining reflection coefficients for the primary color, the secondary color, and the tertiary color. FIG. 3(A) shows a process of determining the reflection coefficients for the primary color. By way of example, the diffuse reflection coefficient $Sb(d_C,\lambda)$ for the primary color of cyan is determined according to Equation (8) given below:

$$Sb(d_C,\lambda)=\alpha_C(d_C)\cdot Sb(d_C=0,\lambda)+\beta_C(d_C)\cdot Sb(d_C=50,\lambda)+\gamma_C(d_C)\cdot Sb(d_C=100,\lambda)\ 0\leq d_C\leq 100\% \tag{8}$$

wherein $\alpha_C(d_C)$, $\beta_C(d_C)$, and $\gamma_C(d_C)$ denote weighting coefficients. The diffuse reflection coefficient $Sb(d_C,\lambda)$ at an arbitrary dot percent $d_C$ of cyan is expressed as a linear combination of difuse reflection coefficients $Sb(d_C=0\%,\lambda)$, $Sb(d_C=50\%,\lambda)$, and $Sb(d_C=100\%,\lambda)$ at three reference dot percents ($d_C=0\%$, 50%, 100%). A concrete procedure of determining the weighting coefficients $\alpha_C(d_C)$, $\beta_C(d_C)$, and $\gamma_C(d_C)$ and the reference diffuse reflection coefficients $Sb(d_C=0\%,\lambda)$, $Sb(d_C=50\%,\lambda)$, and $Sb(d_C=100\%,\lambda)$ will be discussed later.

The specular reflection coefficient $Ss(d_C,\lambda)$ at an arbitrary dot percent $d_C$ of cyan is defined by Equation (9), which is similar to Equation (8):

$$Ss(d_C,\lambda)=\alpha_C(d_C)\cdot Ss(d_C=0,\lambda)+\beta_C(d_C)\cdot Ss(d_C=50,\lambda)+\gamma_C(d_C)\cdot Sb(d_C 32\ 100,\lambda)\ 0\leq d_C\leq 100\% \tag{9}$$

The weighting coefficients $\alpha_C$, $\beta_C$, and $\gamma_C$ in Equation (9) may be identical with those in Equation (8). Alternatively the weighting coefficients for the diffuse reflection coefficients $Sb(d_C,\lambda)$ and those for the specular reflection coefficient $Ss(d_C,\lambda)$ may be determined independently. The reflection coefficients Sb and Ss for the primary colors of the ink other than cyan can be also determined according to Equations (8) and (9).

FIG. 3(B) shows a process of determining the reflection coefficients for the secondary color. By way of example, the diffuse reflection coefficient $Sb(d_{C/M},\lambda)$ for the secondary color of cyan and magenta is determined according to Equation (10) given below:

$$Sb(d_{C/M},\lambda)=\frac{\xi_C(d_C)}{2}\cdot Sb(d_{0/M},\lambda)+\frac{\eta_C(d_C)}{2}\cdot Sb(d_{100/M},\lambda)+\frac{\xi_M(d_M)}{2}\cdot Sb(d_{C/0},\lambda)+\frac{\eta_M(d_M)}{2}\cdot Sb(d_{C/100},\lambda) \tag{10}$$

where $\xi_C(d_C)$ and $\eta_C(d_C)$ denote weighting coefficients related to the dot percent $d_C$ of cyan, and $\xi_M(d_M)$ and $\xi_M(d_M)$ denote weighting coefficients related to the dot percent $d_M$ of magenta. The diffuse reflection coefficient $Sb(d_{C/M},\lambda)$ at an arbitrary dot percent $d_{C/M}$ of cyan and magenta is expressed as a linear combination of diffuse reflection coefficients $Sb(d_{0/M},\lambda)$ $Sb(d_{100M},\lambda)$, $Sb(d_{C/0},\lambda)$, and $Sb(d_{C/100},\lambda)$ at four reference points (shown as open squares), which are obtained by projecting a target point (shown as a closed square) of the secondary color on the four sides constituting a two-dimensional color space shown in FIG. 3B). Here '$d_{0/M}$', for example, means that the dot percent of cyan is 0% and that the dot percent of magenta is $d_M$. The diffuse reflection coefficients Sb at the reference points on the respective sides are determined according to the process of determining the diffuse reflection coefficient for the primary color described previously with the drawing of FIG. 3(A). Namely the diffuse reflection coefficient $Sb(d_{C/M},\lambda)$ for the secondary color is given as a linear combination of the reference diffuse reflection coefficients at end points (shown by closed circles) and midpoints (shown by open circles) of the respective sides in the two-dimensional color space shown in FIG. 3(B). Among all the reference colors giving the reference reflection coefficients, the reference colors at midpoints (open circles) of the respective sides are referred to as 'quasi-reference colors', and those at the end points (closed circles) of the respective sides as 'reference colors in narrower sense'.

Among the four reference points (open squares) shown in FIG. 3(B), the reference point having the dot percent $d_{100/M}$ and the reference point having the dot percent $d_{C/100}$ are the secondary color (that is, the color printed with two color inks) according to the definition of the N-order color. However, these colors of $d_{100/M}$ and $d_{C/100}$ are referred to as 'pseudo-primary colors' in determining the reflection coefficients for a secondary color of $d_{C/M}$. In other words, in determining the reflection coefficients for a specific secondary color, colors at the reference points which are located by projecting the specific secondary color on the respective one-dimensional color spaces (that is, the respective sides) constituting the periphery of the two-dimensional color space which includes the specific secondary color are referred to as 'pseudo-primary colors'. Generally, colors at the reference points which are located by projecting a specific N-order color on the respective (N−1)-dimensional color spaces constituting the periphery of the N-dimensional color space which includes the specific N-order color are referred to as 'pseudo-(N−1)-order colors in determining the reflection coefficients for the N-order color.

In Equation (10) given above, the weighting coefficients $\xi_C(d_C)$ $\eta_C(d_C)$, $\xi(d_M)$ and $\eta_M(d_M)$ are divided by two so that the sum of the weights for the four diffuse reflection coefficients included becomes substantially equal to one. As discussed later, the sum of the weighting coefficients $\xi_C(d_C)$ and $\eta_C(d_C)$ related to cyan is substantially equal to one, and the sum of the weighting coefficients $\xi_M(d_M)$ and $\eta_M(d_M)$ related to magenta is also substantially equal to one. Since Equation 13 includes two sets of weighting coefficients ((,( ), division of each weighting coefficient by two makes the sum of the weights substantially equal to one. A concrete procedure of determining the weighting coefficients $\xi_C(d_C)$ $\eta_C(d_C)$, $\xi_M(d_M)$ and $\eta_M(d_M)$ will be described later.

The specular reflection coefficient $Ss(d_{C/M},\lambda)$ at an arbitrary dot percent $d_{C/M}$ of cyan and magenta is determined according to an equation similar to Equation (10), and is not specifically described here. The weighting coefficients for the diffuse reflection coefficient Sb and those for the specular reflection coefficients Ss may be determined independently. The reflection coefficients Sb and Ss for the secondary color other than the combination of cyan and magenta can be also determined according to an equation similar to Equation (10).

FIG. 3(C) shows a process of determining the reflection coefficients for the tertiary color. By way of example, the diffuse reflection coefficient $Sb(d_{C/M/Y},\lambda)$ for the tertiary color of cyan, magenta, and yellow is determined according to Equation (11) given below:

$$Sb(d_{C/M/Y},\lambda)=\frac{\xi_C(d_C)}{3}\cdot Ss(d_{0/M/Y},\lambda)+\frac{\eta_C(d_C)}{3}\cdot Sb(d_{100/M/Y},\lambda)+\frac{\xi_M(d_M)}{3}\cdot Sb(d_{C/0/Y},\lambda)+\frac{\eta_M(d_M)}{3}\cdot Sb(d_{C/100/Y},\lambda)+\frac{\xi_Y(d_Y)}{3}\cdot Sb(d_{C/M/0},\lambda)+\frac{\eta_Y(d_Y)}{3}\cdot Sb(d_{C/M/100},\lambda) \tag{11}$$

where $\xi_Y(d_Y)$ and $\eta_Y(d_Y)$ denote weighting coefficients related to the dot percent $d_Y$ of yellow. The diffuse reflection coefficient $Sb(d_{C/M/Y},\lambda)$ at arbitrary dot percents $d_{C/M/Y}$ of cyan, magenta, and yellow is given as a linear combination of the diffuse reflection coefficients of the pseudo-secondary colors at six reference points (shown by closed squares), which are located by projecting a target point (shown by an open triangle) of the tertiary color on the six faces constituting the periphery of a three-dimensional color space shown in FIG. 3(C).

The diffuse reflection coefficients Sb of the pseudo-secondary colors at the reference points on the respective planes of FIG. 3(C) are determined according to the process of determining the diffuse reflection coefficient for the secondary color described previously with the drawing of FIG. 3(B). As discussed previously, the diffuse reflection coefficient for the secondary color is given as a linear combination of the reference diffuse reflection coefficients at end points (shown by closed circles) and midpoints (shown by open circles) of the respective sides in each two-dimensional color space. The diffuse reflection coefficient $Sb(d_{C/M/Y},\lambda)$ for the tertiary color is accordingly expressed as a linear combination of the reference diffuse reflection coefficients at the end points (closed circles) and the midpoints (open circles) of the twelve sides constituting the three-dimensional color space shown in FIG. 3(C).

In Equation (11) given above, the weighting coefficients $\xi_C(d_C)$, $\eta_C(d_C)$, $\xi_M(d_M)$, $\eta_M(d_M)$, $\xi_Y(d_Y)$ and $\eta_Y(d_Y)$ are divided by three so that the sum of the weights for the six diffuse reflection coefficients becomes substantially equal to one.

The specular reflection coefficient $Ss(d_{C/M/Y},\lambda)$ at arbitrary dot percents $d_{C/M/Y}$ is also determined according to an equation similar to Equation (11), and is not specifically described here. The weighting coefficients for the diffuse reflection coefficient Sb and those for the specular reflection coefficients Ss may be determined independently. The reflection coefficients Sb and Ss for the tertiary color other than the combination of cyan, magenta, and yellow can be also determined according to an equation similar to Equation (11).

The diffuse reflection coefficient $Sb(d_{C/M/Y/K},\lambda)$ for the quaternary color of cyan, magenta, yellow, and black is determined according to Equation (12) given below:

$$Sb(d_{C/M/Y/K},\lambda)= \frac{\xi_C(d_C)}{4}\cdot Sb(d_{0/M/Y/K},\lambda)+\frac{\eta_C(d_C)}{4}\cdot Sb(d_{100/M/Y/K},\lambda)+ \frac{\xi_M(d_M)}{4}\cdot Sb(d_{C/0/Y/K},\lambda)+\frac{\eta_M(d_M)}{4}\cdot Sb(d_{C/100/Y/K},\lambda)+ \frac{\xi_Y(d_Y)}{4}\cdot Sb(d_{C/M/0/K},\lambda)+\frac{\eta_Y(d_Y)}{4}\cdot Sb(d_{C/M/100/K},\lambda)+ \frac{\xi_K(d_K)}{4}\cdot Sb(d_{C/M/Y/0},\lambda)+\frac{\eta_K(d_K)}{4}\cdot Sb(d_{C/M/Y/100},\lambda) \quad (12)$$

The diffuse reflection coefficient $Sb(d_{C/M/Y/K},\lambda)$ at arbitrary dot percents $d_{C/M/Y/K}$ of cyan, magenta, yellow, and black is given as a linear combination of the diffuse reflection coefficients of the pseudo-tertiary colors at eight reference points which are located by projecting a target point of the quaternary color on the eight three-dimensional color spaces constituting the periphery of a four-dimensional color space. From the analogy to the process of determining the reflection coefficients up to the tertiary color, the reflection coefficient for the quaternary color according to Equation (12) is given as a linear combination of the reference diffuse reflection coefficients at end points and midpoints of the 32 ($=4\times2^{(4-1)}$) sides constituting the four-dimensional color space.

Equations (10) through (12) are generalized to determine a diffuse reflection coefficient $Sb(d_{1-N},\lambda)$ for an n-order color of an arbitrary dot percent, where n is an integer of not less than 2, according to Equation (13) given below:

$$S_b(d_{1\sim n},\lambda)=\sum_{k=1}^{n}\left\{\frac{\xi_k(d_k)}{n}\cdot S_b(d_k=0,\lambda)+\frac{n_k(d_k)}{n}\cdot S_b(d_k=100,\lambda)\right\} \quad (13)$$

wherein $Sb(d_k=0,\lambda)$, represents a diffuse reflection coefficient when the dot percent of a k-th ink is equal to 0% and the dot percents of the other inks are equal to those of the n-order color. Equations (10) through (12) correspond to Equation (13) when n is set equal to 2, 3, and 4, respectively. For the determination of a diffuse reflection coefficient $Sb(d_{1-N},\lambda)$ for an N-order color, diffuse reflection coefficients $Sb(d_{1-n},\lambda)$ for n-order colors are successively determined by recursion formula of Equation (13), where n is varied successively from 2 to N.

A specular reflection coefficient $Ss(d_{1-n},\lambda)$ for an n-order color of an arbitrary dot percent, where n is an integer of not less than 2, is determined according to Equation (14), which is similar to Equation (13):

$$S_s(d_{1\sim n},\lambda)=\sum_{k=1}^{n}\left\{\frac{\xi_k(d_k)}{n}\cdot S_s(d_k=0,\lambda)+\frac{n_k(d_k)}{n}\cdot S_s(d_k=100,\lambda)\right\} \quad (14)$$

As will be inferred from the process of determining the reflection coefficients up to the tertiary color, the reflection coefficients for the n-order color according to Equations (13) and (14) are respectively given as a linear combination of the reflection coefficients for the pseudo-(n−1)-order colors at 2n pieces of reference points which are located by projecting a target point of the n-order color on 2n pieces of (n−1)-order color spaces constituting the periphery of an n-dimensional color space. In other words, these reflection coefficients are respectively expressed as a linear combination of the reference reflection coefficients at end points and midpoints of $n\times2^{(n-1)}$ sides constituting the n-dimensional color space.

The following describes a method of determining reflection coefficients for the primary color and a method of determining reflection coefficients for the secondary color and the higher-order colors.

C. Method of Determining Reflection Coefficients for Primary Color

The diffuse reflection coefficient Sb and the specular reflection coefficient Ss at an arbitrary dot percent of a primary color are determined according to Equations (8) and (9) given above, respectively.

Figure 4:
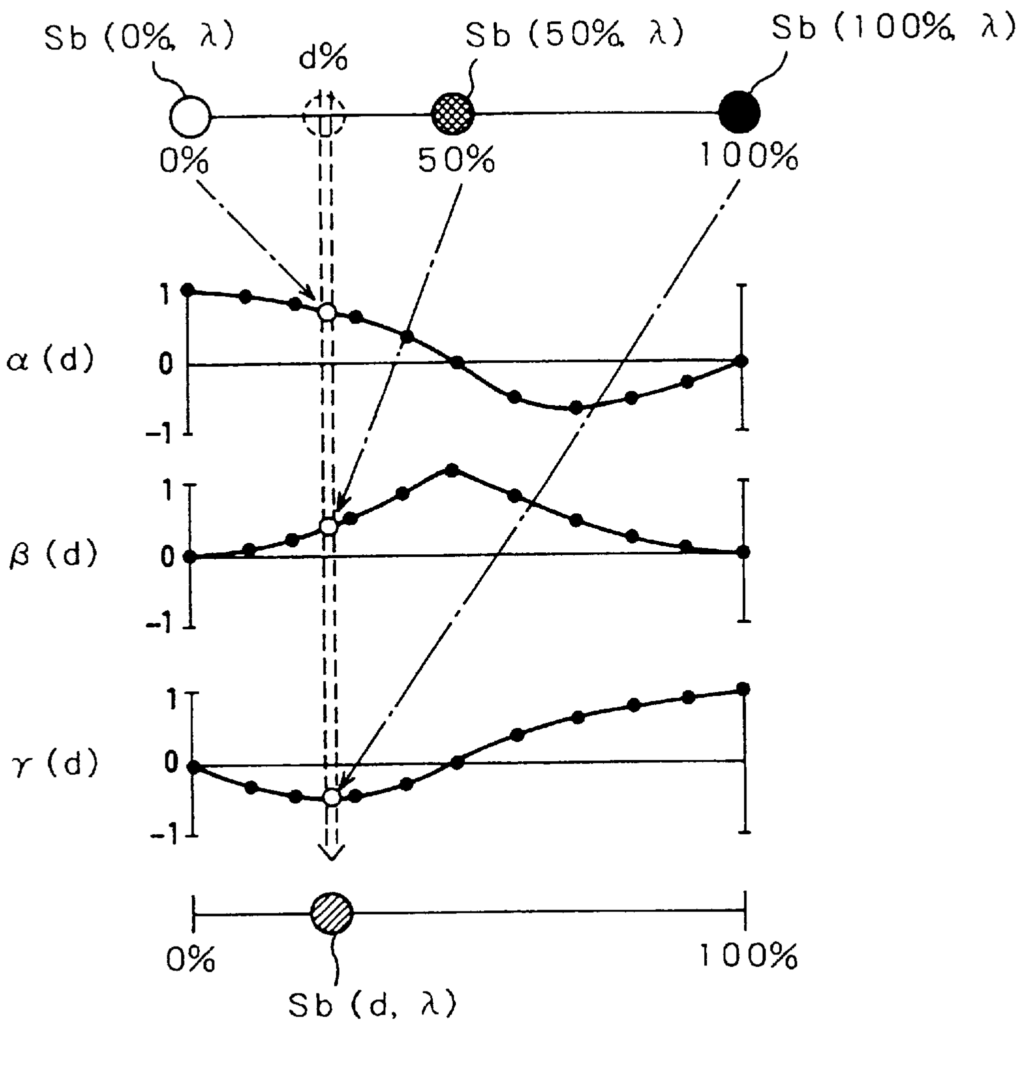
FIG. 4 shows a method of determining a diffuse reflection coefficient Sb (d,λ) for the primary color.

FIG. 4 shows a method of determining the diffuse reflection coefficient Sb for the primary color according to Equation (8). In the drawing of FIG. 4, symbols without subscripts such as 'd', 'α', 'β', and 'γ' are used respectively for the dot percent and the weighting coefficients to mean that an arbitrary ink is concerned.

Reference diffuse reflection coefficients Sb(0%,λ), Sb(50%,λ), and Sb(100%,λ) are experimentally determined in advance at reference dot percents (0%,50%,100%) as discussed later. The reference diffuse reflection coefficients Sb(0%,λ), Sb(50%,λ), and Sb(100%,λ) depend upon the wavelength λ of a light beam and are thereby determined for plural values of the wavelength λ as discussed later. By way of example, the wavelength range of visible rays (about 380 to 780 nm) is divided into approximately 60 wavelength domains, and the reference diffuse reflection coefficients Sb(0%,λ), Sb(50%,λ), and Sb(100%,λ) for each wavelength domain are obtained in advance. A concrete procedure of determining the reference diffuse reflection coefficients Sb(0%,λ), Sb(50%,λ), and Sb(100%,λ) will be discussed later.

The respective weighting coefficients $\alpha(d)$, $\beta(d)$, and $\gamma(d)$ depend upon the dot percent d as shown in FIG. 4. The value of the weighting coefficient $\alpha(d)$ with respect to the reference diffuse reflection coefficient $Sb(0\%,\lambda)$ is equal to one when the dot percent d of a target printed area is equal to 0%, and equal to zero when the dot percent d is equal to 50% or 100%. Each of the weighting coefficients $\alpha$, $\beta$, and $\gamma$ is equal to one when the dot percent d of a target printed area is equal to a dot percent $d_i$ of a reference diffuse reflection coefficient $Sb(d_i,\lambda)$ related to the weighting coefficient concerned, and equal to zero when the dot percent d is equal to a dot percent $d_j$ of another reference diffuse reflection coefficient $Sb(d_j,\lambda)$.

Referring to FIG. 4, a variation in weighting coefficient $\alpha(d)$ is represented by eleven points (shown by dosed circles in the drawing) in the range of $0 \leqq d \leqq 100\%$. The value of the weighting coefficient $\alpha(d)$ at an arbitrary dot percent d is determined by interpolating the eleven values of the coefficient $\alpha$. One available process determines the weighting coefficient $\alpha(d)$ by linearly interpolating the two values of coefficient closest to the target dot percent d. Another available process determines the weighting coefficient $\alpha(d)$ by non-linearly interpolating the values of coefficient at three or more different points. This is also applicable to the other weighting coefficients $\beta(d)$, and $\gamma(d)$.

Figure 5:
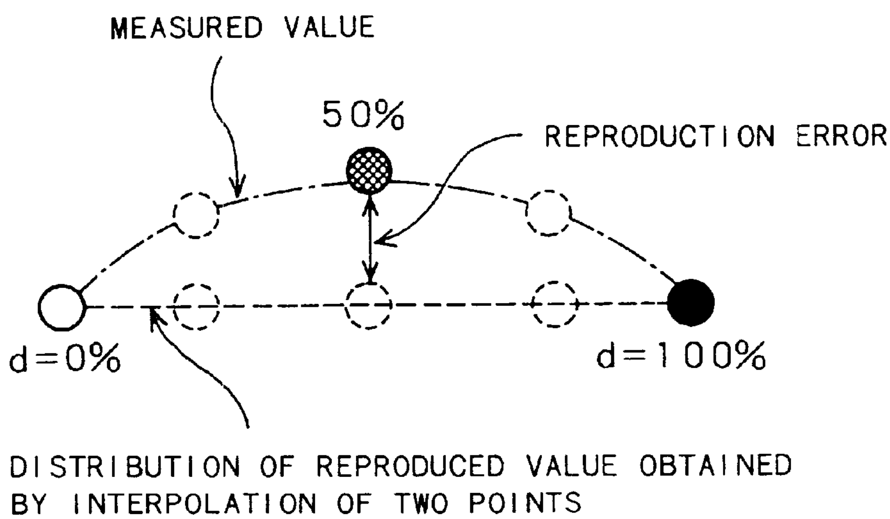
FIG. 5 conceptually shows advantages of the method of determining a reflection coefficient for the primary color by interpolating three reference reflection coefficients.

FIG. 5 conceptually shows advantages of the method of determining a reflection coefficient $Sb(d, \lambda)$ at an arbitrary dot percent d by interpolating the three reference diffuse reflection coefficients $Sb(0\%,\lambda)$, $Sb(50\%,\lambda)$, and $Sb(100\%,\lambda)$ as shown in FIG. 4. The broken line on the bottom of FIG. 5 represents the reproduced values obtained by interpolating the two points of 0% and 100%. The one-dot chain line represents measured values. The reproduced values by interpolation of two points tends to have a substantial reproduction error at the dot percent d close to 50%. In this embodiment, the point of the dot percent=50% is added as a basis for interpolation, and a reproduced value at an arbitrary dot percent is approximated by a linear combination of the three points of 0%, 50%, and 100% according to Equations (8) and (9) discussed above. This procedure decreases the reproduction error at the dot percent close to 50%.

It is required to determine the following components in advance, in order to determine an illuminance spectrum $I(d,\theta,\rho,\lambda)$ of reflected light from a printed area at an arbitrary dot percent d according to Equations (7) through (9) discussed above:

(1) reference diffuse reflection coefficients $Sb(0\%,\lambda)$, $Sb(50\%,\lambda)$, and $Sb(100\%,\lambda)$;

(2) reference specular reflection coefficients $Ss(0\%,\lambda)$, $Ss(50\%,\lambda)$, and $Ss(100\%,\lambda)$;

(3) variations in weighting coefficients $\alpha(d)$, $\beta(d)$, and $\gamma(d)$ (see FIG. 4); and (4) form of the characteristic $fs(\rho)$ depending upon the angle $\rho$.

The following describes a method of determining the above required components (hereinafter referred to as 'reference data') and reproducing a print based on these reference data.

D. Processing Routine in Embodiment

Figure 6:
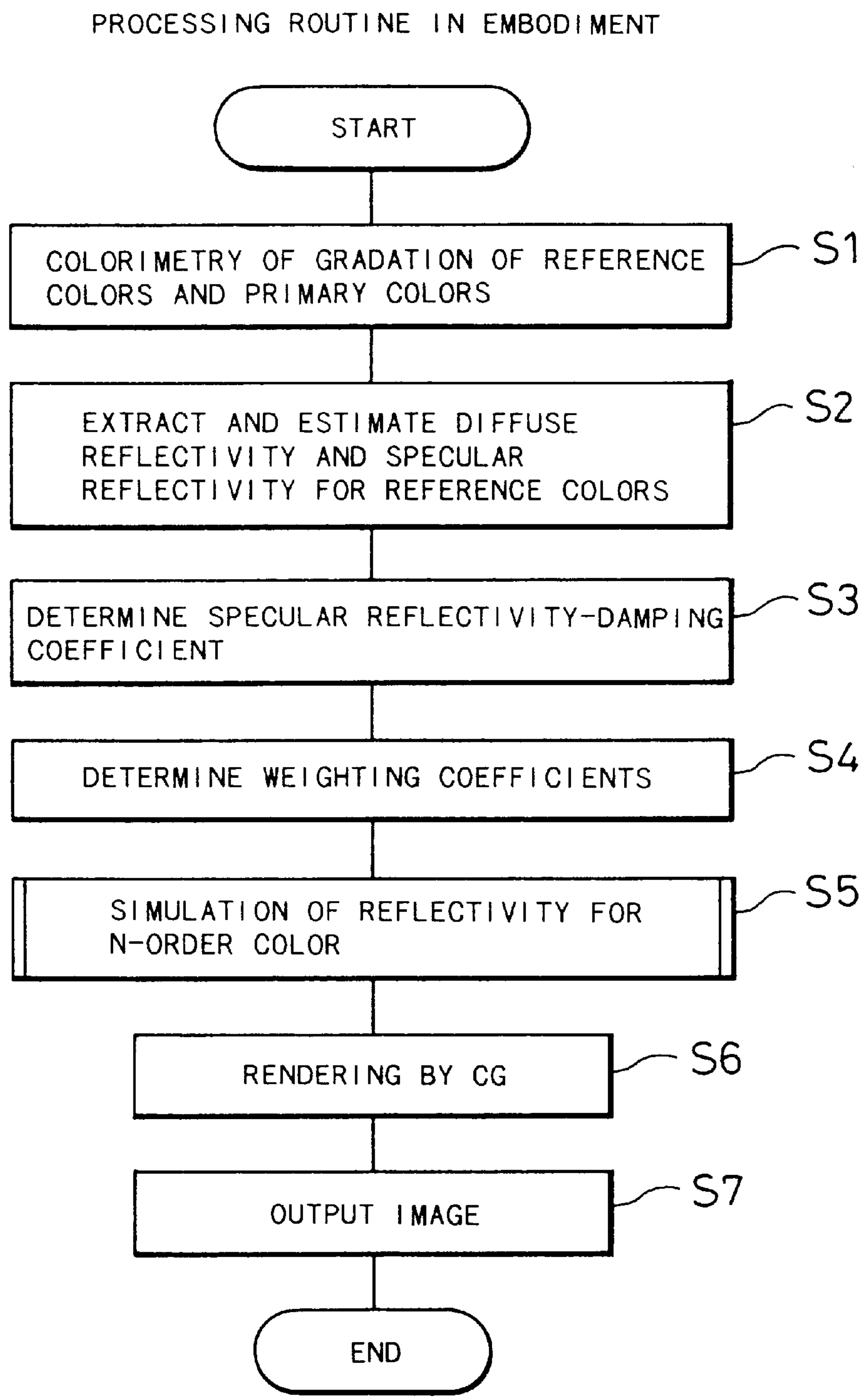
FIG. 6 is a flowchart showing a processing routine executed in the embodiment.
Figure 7:
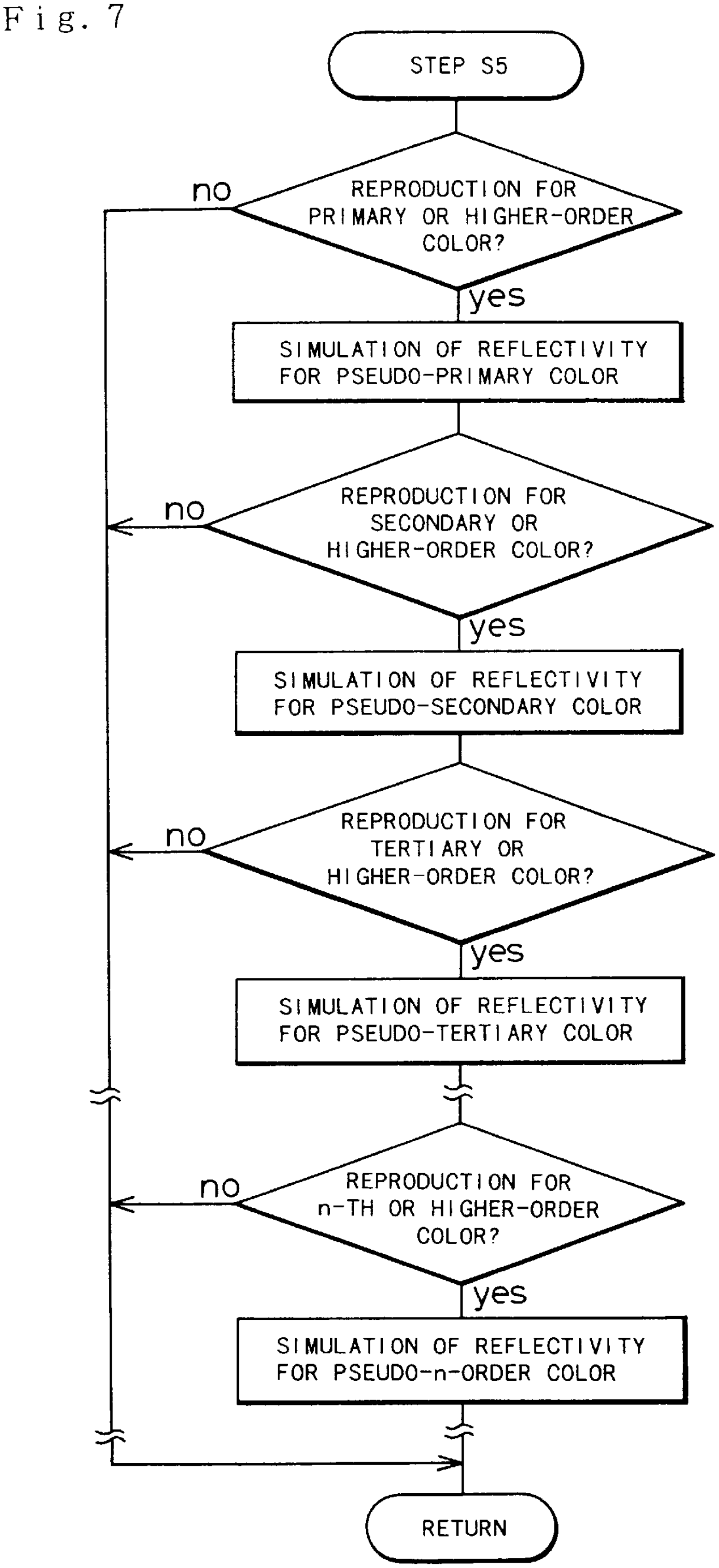
FIG. 7 is a flowchart showing a processing routine executed in the embodiment.

FIGS. 6 and 7 are flowcharts showing a processing routine executed in the embodiment. At step S1 in FIG. 6, a gradation was produced including the reference colors and a plurality of primary colors other than the reference colors for each of plural inks, which are a constituent of an N-order color, and a spectral reflectivity of the gradation was measured. The 'reference color' here denotes the color of the color chip which has a dot percent related to one of the reference reflection coefficients in the above Equations (8) and (9) (that is, 0%, 50%, and 100%). The reference colors represent the primary colors whose dot percent is related to one of the reference reflection coefficients. The 'gradation' denotes a print in which color chips of the reference colors and the primary colors are arranged in the order of the dot percent.

Figure 8:
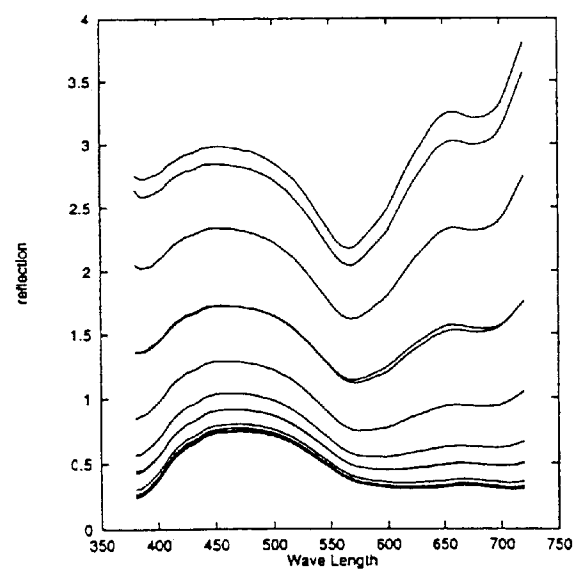
FIGS. 8(A)–8(C) show the details of the process carried out at step S1.

FIGS. 8(A)–8(C) show the details of the process carried out at step S1. In the gradation, a single printing ink (for example, cyan) was applied on each chip by the dot percent of 0% to 100% by every 10% as shown in FIG. 8(A). FIG. 8(B) shows conditions of measurement of the spectral reflectivity. The spectral reflectivity is obtained by normalizing the illuminance spectrum $I(d,\theta,\rho,\lambda)$ of reflected light with a luminance spectrum $\phi(\lambda)$ of incident light, and is accordingly expressed as $I(d,\theta,\rho,\lambda)/\phi(\lambda)$. As shown in FIG. 8(B), two points of 8° and 10° were set as the angle of reflection $\theta$ in this embodiment. The angles in the range of −10° to 34° by every 2° and the angle of 35° were set as the angle of deviation $\rho$. In Equation (7) discussed above, $\cos\theta$ is the only component depending upon the angle of reflection $\theta$. One value is accordingly sufficient for the angle of reflection $\theta$ as the condition of measurement. In this embodiment, however, two values were set as the angle of reflection $\theta$ for the purpose of improving the accuracy. The angle of deviation $\rho$ was set at relatively small intervals, in order to determine the dependency of the element $fs(\rho)$ upon the angle of deviation $\rho$ (that is, the functional form of $fs(\rho)$).

Figure 9:
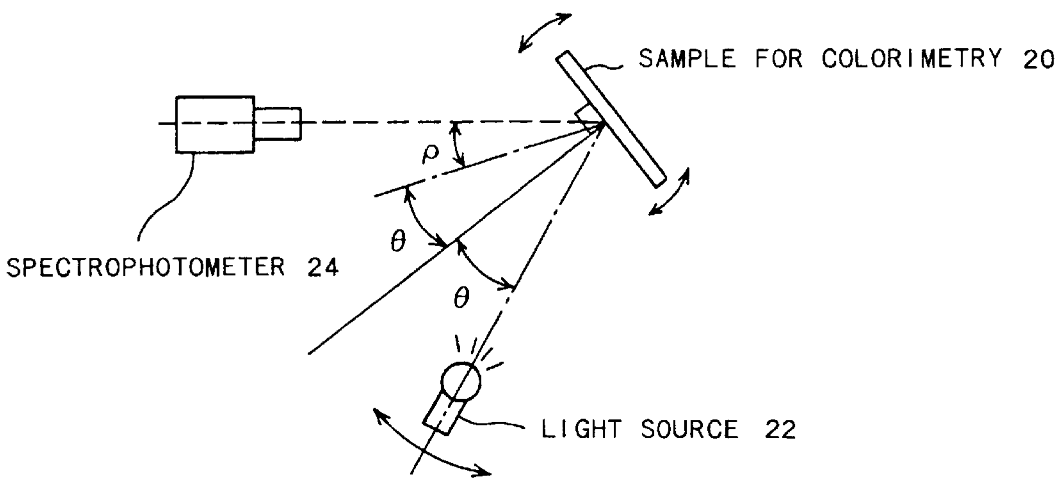
FIG. 9 conceptually illustrates an apparatus for measuring the spectral reflectivity.

At step S1, the spectral reflectivity shown in FIG. 8(C) was measured under each of the measurement conditions shown in FIG. 8(B) for each of the eleven color chips shown in FIG. 8(A). FIG. 9 conceptually illustrates an apparatus for measuring the spectral reflectivity. A colorimetry sample 20 was mounted on a sample table (not shown) and irradiated with a light beam emitted from a light source 22, and the illuminance spectrum $I(d,\theta,\rho,\lambda)$ of reflected light was measured by a spectrophotometer 24. A standard white plate as well as the respective color chips of the gradation shown in FIG. 8(A) were used as the colorimetry sample 20. The standard white plate used in the embodiment has the spectral reflectivity approximately equal to one. The illuminance spectrum of reflected light from the standard white plate accordingly corresponds to the luminance srectrum $\phi(\lambda)$ of incident light. The spectral reflectivity was thus calculated by normalizing the illuminance spectrum $I(d,\theta,\rho,\lambda)$ of reflected light for each color chip with the luminance srectrum $\phi(\lambda)$ for the standard white plate. The standard white plate has the specular reflection component substantially equal to zero, and its measurement accordingly does not depend upon the angle of deviation $\rho$. The angle of incidence $\theta$ for the standard white plate was set identical with those of the other samples of colorimetry (at least either of 8° and 10°) while the angle of deviation $\rho$ was set equal to −10°.

The measured data were analyzed by a personal computer. The light source 22 used was a day-light flood lamp of standard light D65. The measurement was carried out in a darkroom in order to realize the ideal observation condition free from ambient light.

Figure 10:
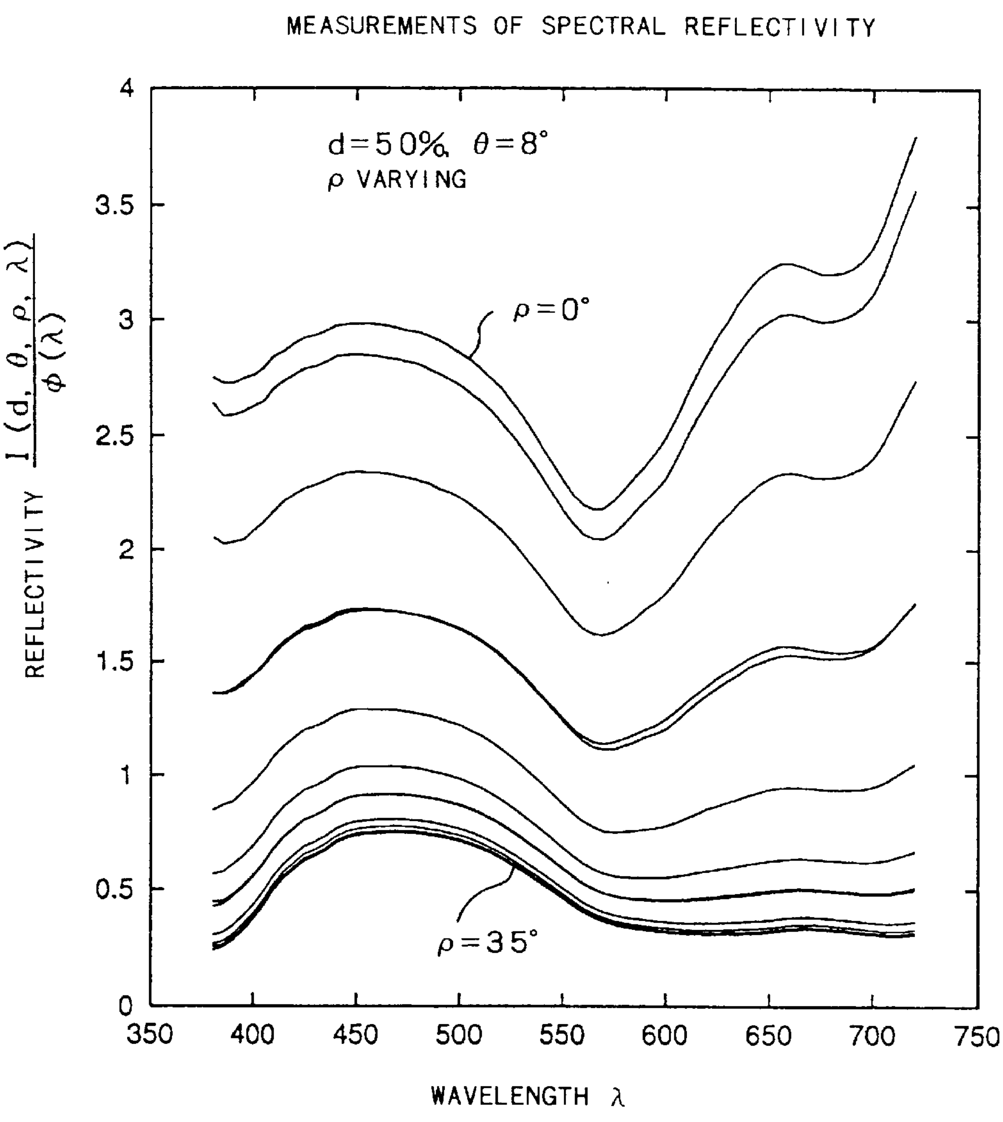
FIG. 10 is a graph showing the measurements of spectral reflectivity.

FIG. 10 is an enlarged graph showing the measured spectral reflectivity shown in FIG. 8(C). This graph shows a plurality of results of measurement with respect to various values of the angle of deviation $\rho$ under the condition of the dot percent d=50% and the angle of incidence $\theta$=8°. The reflectivity of 1.0 represents the level of the illuminance spectrum of the standard white plate. The spectral reflectivity of the colorimetry sample may exceed 1.0. This is because the measurement of the standard white plate does not include the specular reflection component and the measurements of the colorimetry sample including the specular reflection component may thus be greater than that of the standard white plate.

Referring back to the flowchart of FIG. 6, at step S2, diffuse reflection components Ib(d,θ,λ) in Equation (7) was extracted from the measured spectral reflectivity for the primary colors, and specular reflection components Is(d,ρ,λ) was estimated. FIG. 11 shows a process of determining the diffuse reflection components and the specular reflection components based on the spectral reflectivities and subsequently determining the weighting coefficients α, β, and γ. At step S2, the diffuse reflection components shown in FIG. 11(B) were extracted from the spectral reflectivities shown in FIG. 11(A), and the specular reflection components shown in FIG. 11(C) were estimated.

The spectral reflectivities under the condition of ρ=35° and θ=8° were used for the extraction of the diffuse reflection component. Since the dependency upon the angle of incidence θ is known to be defined as cos θ, either one of 8° and 10° may be selected for the value of the angle of incidence θ. The largest value 35° among the measurement conditions was selected as the angle of deviation ρ. The following gives the reason of such selection. As discussed previously, the dependency fs(ρ) upon the angle of deviation ρ included in Equation (7) represents the characteristic that is equal to one when ρ=0 and abruptly decreases in a monotonic manner with an increase in ρ in the range of 0≦ρ≦90°. As clearly understood from Equation (7), upon condition that ρ is sufficiently large and the angular component fs(ρ) can be regarded as zero, the specular reflection component Is(d,θ, λ)/ϕ(λ)=Ss(d,*u*)fs(ρ) is equal to zero. Under such conditions, the measured spectral reflectivity would correspond to the diffuse reflection component Ib(d,θ, λ)/ϕ(λ)=Sb(d,λ)cos θ. Since the angular component fs(ρ) has a value close to cos $^n$ρ, where n ranges approximately from 300 to 400, the value of fs(35°) can be regarded as zero while the error due to it is negligibly small.

Figure 12:
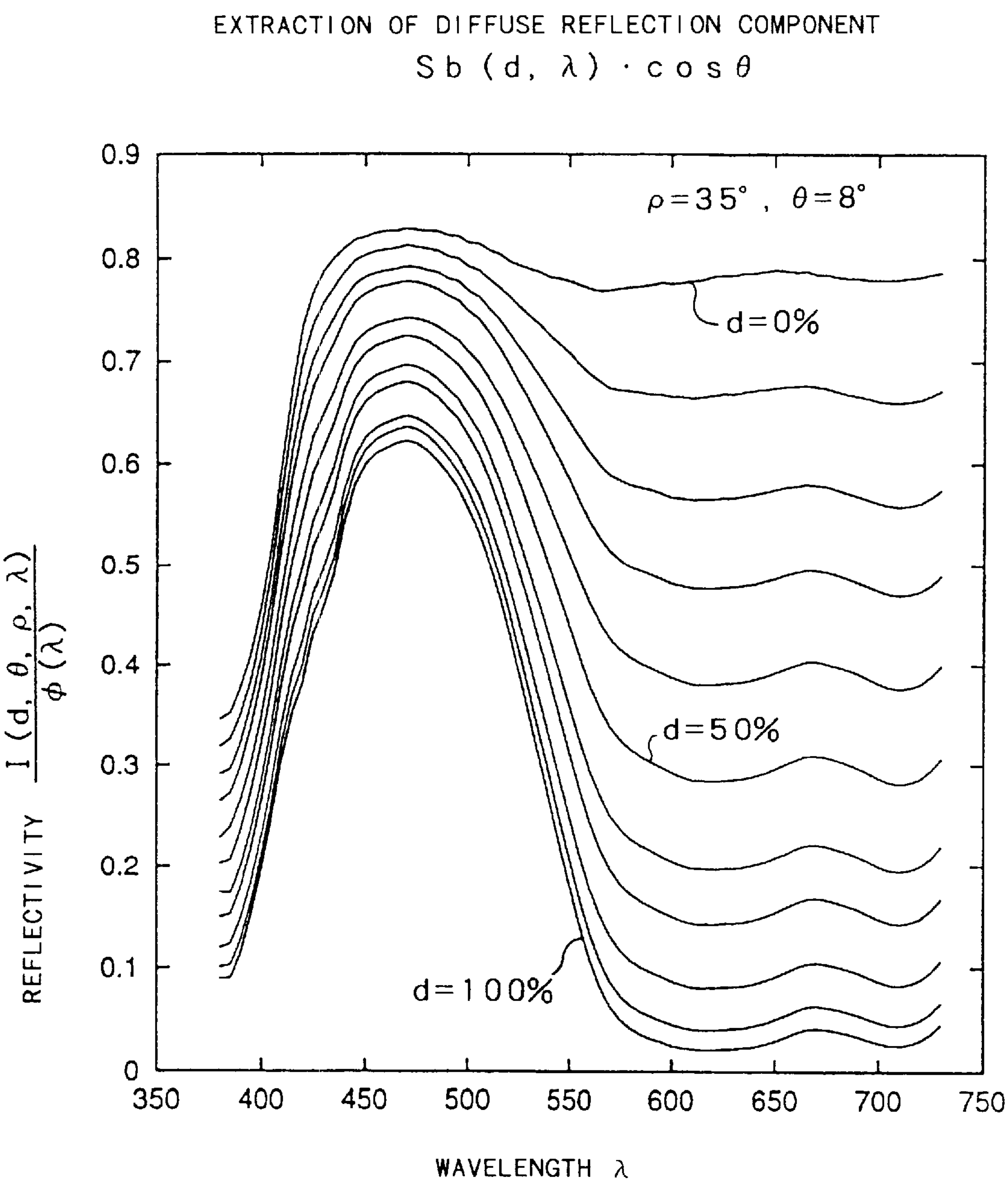
FIG. 12 is a graph showing the plot of diffuse reflection component Sb(d,λ)cos θ extracted under the condition of ρ=35° and θ=8°.

FIG. 12 is a graph showing the plot of diffuse reflection component Sb(d,λ)cos θ extracted under the condition of ρ=35° and θ=8°. This graph shows the wavelength dependency of the diffuse reflection component Sb(d,λ)cos θ for each color chip having different dot percent d. In this embodiment, the diffuse reflection coefficient Sb (d,λ) was calculated by dividing the diffuse reflection component by cos θ as shown in Equation (15) given below:

$$Sb(d,\lambda)=\frac{Ib(d,\theta,\lambda)}{\cos\theta\cdot\phi(\lambda)} \tag{15}$$

The spectral reflectivities under the condition of ρ=0° and θ=8° were used for the estimation of the specular reflection component Is(d,θ,λ). The angle of incidence θ used here was equal to that used in the extraction of the diffuse reflection component. The angle of deviation ρ was set equal to 0° in order to select the condition realizing fs(ρ)=1. The detailed form of the dependency fs(ρ) upon the angle of deviation is unknown, but it is known that fs(0)=1 according to the definition thereof. Namely when the angle of deviation ρ is equal to zero, the specular reflection component Is(d,ρ=0,λ) is equal to the product of the specular reflectivity Ss(d,λ) and the spectrum ϕ(λ) of incident light. Determination of the specular reflection component Is(d,ρ=0,λ) under the condition of ρ=0 accordingly determines the specular reflectivity Ss(d,λ).

Based on Equation (7) discussed above, the spectral reflectivity I(d,θ,ρ=0,λ)/ϕ(λ) at the angle of deviation ρ=0 is given by Equation (16):

$$\frac{I(d,\theta,\rho=0,\lambda)}{\phi(\lambda)}=Sb(d,\lambda)\cdot\cos\theta+Ss(d,\lambda) \tag{16}$$

Equation (16) is rewritten to Equation (17) to determine the specular reflection component Ss(d, λ):

$$Ss(d,\lambda)=\frac{I(d,\theta,\rho=0,\lambda)}{\phi(\lambda)}-Sb(d,\lambda)\cdot\cos\theta \tag{17}$$

Figure 13:
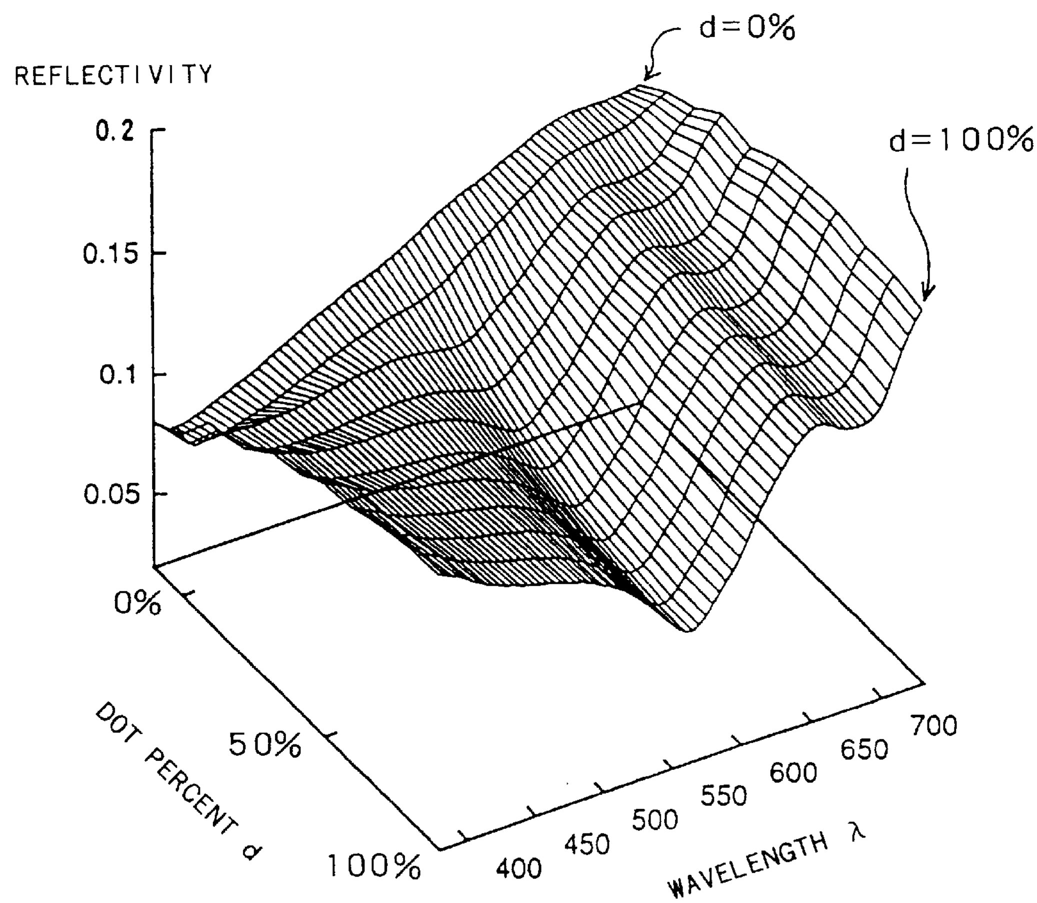
FIG. 13 is a graph showing the plot of specular reflection component Ss (d,λ) estimated under the condition of θ=8°.

FIG. 13 is a graph showing the plot of specular reflection coefficient Ss (d,λ) estimated according to Equation (17) under the condition of θ=8°. This graph shows the wavelength dependency of the specular reflection coefficient Ss(d,λ) for each color chip of the primary color having different dot percent d.

Referring back again to the flowchart of FIG. 6, the process at step S3 determined the form of fs(ρ) of the specular reflection component upon the angle of deviation ρ. The dependency fs(ρ) is also referred to as the 'specular reflectivity-damping coefficient'. As clearly understood from Equation (7) discussed above, the spectral reflectivity I/ϕ depends upon only the angle of deviation ρ upon condition that the dot percent d, the angle of incidence θ, and the wavelength λ are all fixed. The functional form of the dependency fs(ρ) was accordingly determined by measuring the dependency of the spectral reflectivity I/ϕ upon the angle of deviation ρ while the dot percent d, the angle of incidence θ, and the wavelength λ were all fixed. It was then found that fs(ρ) had the functional form of the Gaussian distribution defined by Equation 18) given below:

$$fs(\rho)=e^{-\sigma\rho^2} \tag{18}$$

wherein the constant σ ranges from approximately 70 to 90. The unit of the angle of deviation ρ is radian in Equation (18). In this embodiment σ=80 was obtained by the least square method.

The following Equation (19) is also applicable for the functional form of fs(ρ).

$$fs(\rho)=\cos^{n_0}\rho \tag{19}$$

wherein the exponent $n_0$ ranges from approximately 350 to 400. Both the dependency fs(ρ) given by Equation (18) and by Equation (19) represent the characteristic that is equal to one when ρ=0 and abruptly decreases in a monotonic manner with an increase in p in the range of 0≦σ≦90°.

Referring back again to the flowchart of FIG. 6, the process at step S4 determined the weighting coefficients α, β, and γ (see FIG. 11(D)) used in Equations (8) and (9) mentioned above. In this embodiment, the weighting coefficients α, β, and γ were calculated from the diffuse reflection coefficient Sb(d, λ) obtained at step S2 according to the following procedure. Equation (8) given above was expanded to simultaneous equations regarding plural values of the wavelength λ, and the simultaneous equations were written as Equations (20) and (21a)–(21c) using the matrices:

$$V_{org}=K_{\alpha\beta\gamma}\cdot V_{prim} \tag{20}$$

where $$V_{org} = (Sb(d,\lambda)) = \begin{pmatrix} Sb(d,\lambda\min) \\ \cdots \\ Sb(d,\lambda\max) \end{pmatrix} \quad (21a)$$

$$K_{\alpha\beta\gamma} = (\alpha(d)\beta(d)\gamma(d)) \quad (21b)$$

$$V_{prim} = \begin{pmatrix} Sb(0\%,\lambda) \\ Sb(50\%,\lambda) \\ Sb(100\%,\lambda) \end{pmatrix} = \begin{pmatrix} Sb(0\%,\lambda\min) & \cdots & Sb(0\%,\lambda\max) \\ Sb(50\%,\lambda\min) & \cdots & Sb(50\%,\lambda\max) \\ Sb(100\%,\lambda\min) & \cdots & Sb(100\%,\lambda\max) \end{pmatrix} \quad (21c)$$

As shown in Equations (21a)–(21c), the matrix Vorg represents the value of the diffuse reflection coefficient Sb(d, λ) with respect to each wavelength (λmin to λmax) in the wavelength range of visible rays at an arbitrary dot percent d. The matrix $K_{\alpha\beta\gamma}$ represents the weighting coefficients α(d), β(d), and γ(d). The matrix Vprim represents the values of the reference diffuse reflection coefficients Sb(0%,λ), Sb(50%,λ), and Sb(100%,λ) with respect to each wavelength (λmin to λmax). Here λmin and λmax respectively denote the minimum and the maximum of the wavelength λ of visible rays. By way of example, when the wavelength λ of visible rays is divided into 60 wavelength domains, Equation (20) corresponds to 60 simultaneous equations.

The values of the diffuse reflection coefficient Sb(d, λ) with respect to the eleven values of the dot percent d (0%, 10%, . . . , 100%) (that is, the matrix Vprim) are obtained at step S2 as discussed previously. Only the matrix $K_{\alpha\beta\gamma}$ representing α(d), β(d), and γ(d) is unknown in the right-hand side of Equation (20). When the simultaneous equations (Equation (20)) having the number of unknown elements less than the number of equations are solved for the unknown matrix $K_{\alpha\beta\gamma}$, the result obtained is equivalent to approximation of the unknown values α(d), β(d), and γ(d) by the method of least squares. In accordance with a concrete procedure, when the matrix $K_{\alpha\beta\gamma}$ is determined according to Equation (22) for the eleven values of the dot percent d (0%, 10%, . . . , 100%), eleven sets of weighting coefficients α(d), β(d), and γ(d) (d=0%, 10%, . . . , 100%) are obtained.

$$K_{\alpha\beta\gamma}=(\alpha(d)\ \beta(d)\ \gamma(d)=V_{org}\cdot V_{prim}^{-1} \quad (22)$$

Figure 14:
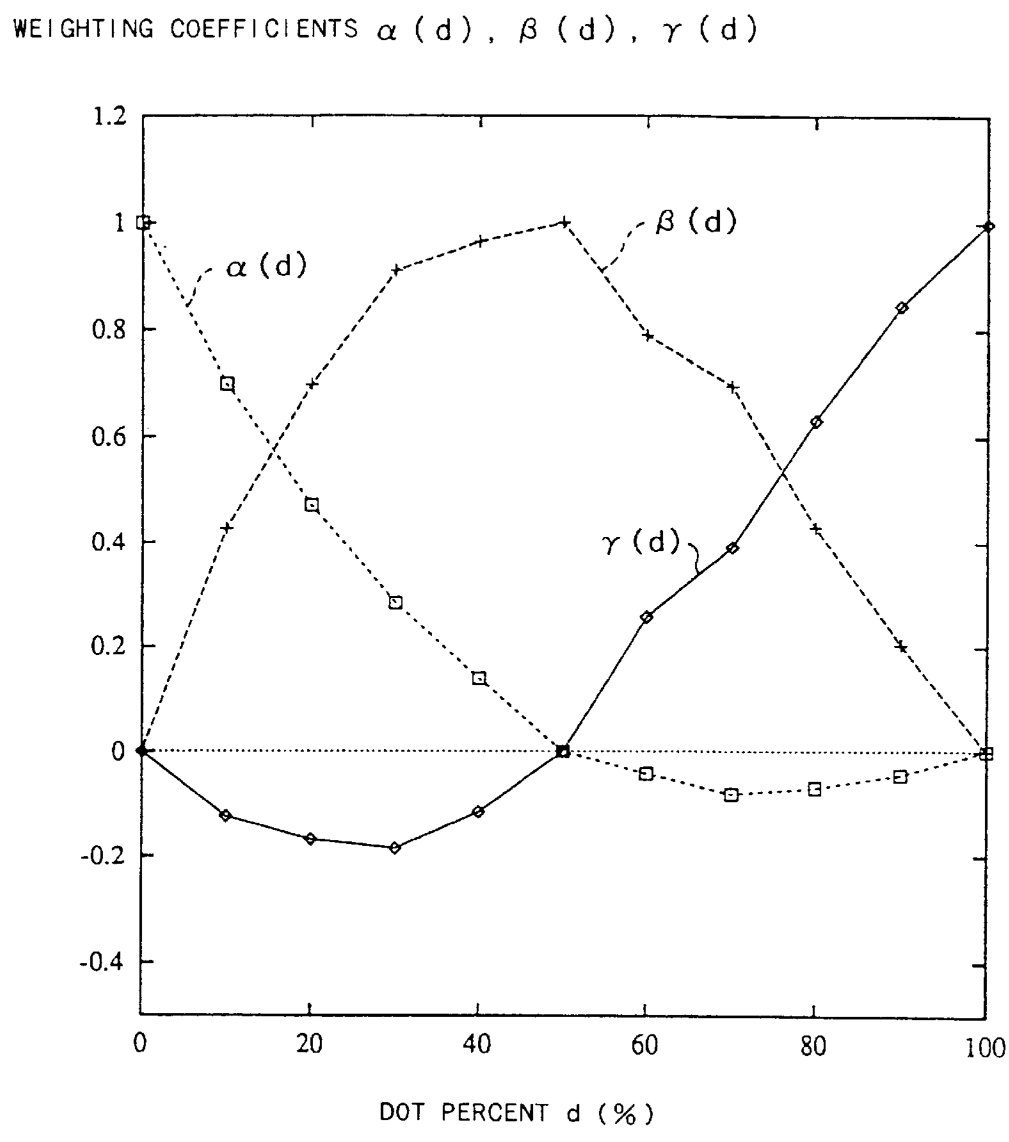
FIG. 14 is a graph showing variations in weighting coefficients α(d), β(d), and γ(d) obtained in the embodiment.

FIG. 14 is a graph showing variations in weighting coefficients α(d), β(d), and γ(d) thus obtained. The weighting coefficients α(d), β(d), and γ(d) shown in FIG. 14 have similar properties to those shown in FIG. 4. While FIG. 4 conceptually shows variations in weighting functions, FIG. 14 shows the values actually obtained in the embodiment.

The process at step S5 in the flowchart of FIG. 6 carried out simulation for the N-order color based on the results obtained at steps S2 through S4. FIG. 7 shows the details of the process carried out at step S5. As shown in FIG. 7, reflectivities for the primary color to the N-order color (N is an integer of not less than 2) are successively determined in a stepwise manner.

Simulation of the reflectivity for the primary color is carried out in the following manner. The diffuse reflection coefficient Sb(d, λ) at an arbitrary dot percent d is calculated from the weighting coefficients α(d), β(d), and γ(d) and the reference diffuse reflection coefficients Sb(0%,λ), Sb(50%, λ), and Sb(100%,λ) according to Equation (8) discussed above. The specular reflection coefficient Ss(d, λ) is calculated in a similar manner according to Equation (9) discussed above.

Figure 15:
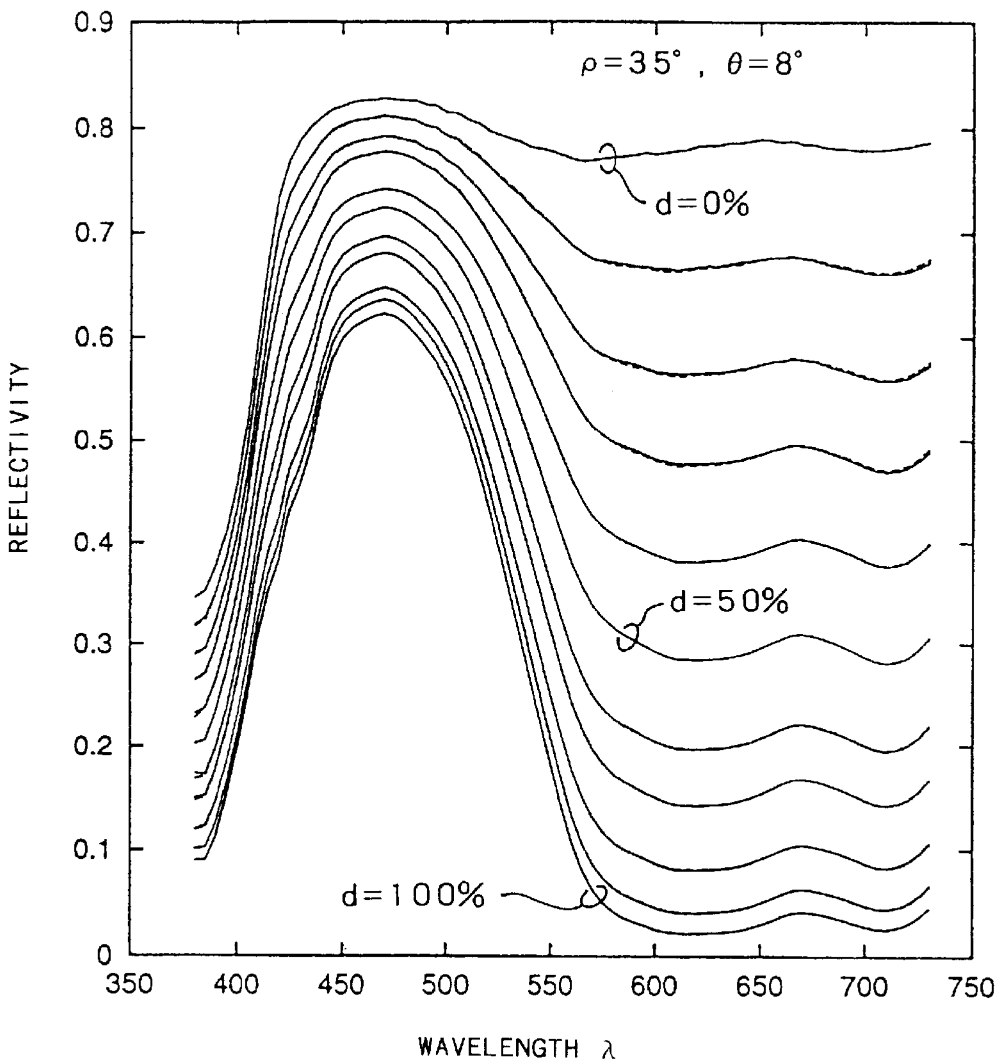
FIG. 15 is a graph showing comparison between the measured values of the diffuse reflection component S(d,λ) cos θ and the results of simulation.

FIG. 15 is a graph showing comparison between the measured values of the diffuse reflection component Sb(d,λ) cos θ (shown by the solid lines) and the results of simulation according to Equation (8) (shown by the broken lines). The solid lines substantially coincide with the broken lines. This shows that the measured values well agree with the results of simulation. The measured values of the specular reflection component also agree well with the result of simulation.

The processing of steps S1 through S4 in the flowchart of FIG. 6 is carried out for each ink, which is a constituent of the high-order color, to determine the reference diffuse reflection coefficients and the reference specular reflection coefficients. The weights α, β, and γ are also obtained for each ink.

In order to determine the reflection coefficients for a secondary target color as shown in FIG. 3(B), it is required to determine the reference reflection coefficients at end points (reference colors) and midpoints (quasi-reference colors) of the four sides constituting a two-dimensional color space (the square plane shown in FIG. 3(B)) including the target color . In this case, the reference reflection coefficients on the four sides are respectively determined according to the routine of FIG. 6. By way of example, a gradation, in which cyan is fixed to 100% and magenta varies from 0% to 100% by every 10%, is created, in order to determine the reference reflection coefficients at both end points (closed circles) and a midpoint (open circle) on a side $A_{M2}$ having cyan=100% in FIG. 3(B). Although this gradation is printed in cyan and magenta and thereby represents a secondary color, the reference reflection coefficients can be determined according to the routine of FIG. 6. It is preferable to determine the weighting coefficients α, β, and γ independently for each of the four sides. The identical values may, however, be used as the weighting coefficients α, β, and γ for the parallel sides (sides $A_{C1}$ and $A_{C2}$, sides $A_{M1}$ and $A_{M2}$ in FIG. 3(B)).

In order to determine the reflection coefficients for a tertiary target color as shown in FIG. 3(C), it is required to determine the reference reflection coefficients at end points and midpoints of the twelve sides constituting a three-dimensional color space (the color solid) including the target color. In this case, the reference reflection coefficients on the twelve sides are respectively determined according to the routine of FIG. 6. It is preferable to determine the weighting coefficients α, β, and γ independently for each of the twelve sides. The identical values may, however, be used as the weighting coefficients α, β, and γ for the parallel sides.

The above description on the reference reflection coefficients to be determined in the secondary color and the tertiary color is readily generalized to the case of N-order color. In order to determine the reflection coefficients for an N-order target color, it is required to determine the reference reflection coefficients at end points and midpoints of the $N\times2^{(N-1)}$ sides constituting an N-dimensional color space including the target color according to the routine of FIG. 6.

E. Method of Determining Reflection Coefficients for Secondary Color

As mentioned above, the diffuse reflection coefficient at an arbitrary dot percent of the secondary color is given by Equation (10). FIGS. 16(A)–16(D) show a method of determining the diffuse reflection coefficient Sb for the secondary color according to Equation (10). FIG. 16(A) is identical with FIG. 3(B) discussed above. Namely the diffuse reflection coefficient $Sb(d_{C/M}, \lambda)$ at arbitrary dot percents $d_{C/M}$ is given as a linear combination of diffuse reflection coefficients $Sb(d_{0/M},\lambda)$, $Sb(d_{100/M},\lambda)$, $Sb(d_{C/0},\lambda)$, and $Sb(d_{C/100},\lambda)$ at four reference points (open squares) which are located by projecting a target point (a closed square) of the secondary color on the four sides constituting the two-dimensional color space. The specular reflection coefficient is given in a similar manner. The reflection coefficients at the four reference points are respectively determined according to the method of determining reflection coefficients for the primary color discussed above.

FIGS. 16(B) and 16(C) respectively show variations in weighting coefficients $\xi$ and $\eta$ depending upon the dot percents $d_M$ and $d_C$ of the respective inks. As shown in FIGS. 16(B) and 16(C), the values of the weighting coefficients $\xi_M(d_M)$, $\eta_M(d_M)$, $\xi_C(d_C)$, and $\eta_C(d_C)$ depend upon the dot percents $d_M$ and $d_C$ of the respective inks constituting the secondary color.

FIG. 16(D) shows the meaning of the weighing coefficients. The weighting coefficients $\xi_M(d_M)$, $\eta_M(d_M)$, $\xi_C(d_C)$, and $\eta_C(d_C)$ constitute a coordinate system for correcting the reflection coefficient $Sb(d_{C/M},\lambda)$ at the target point (closed square) with the reflection coefficients at the reference points (open squares). This coordinate system will be hereinafter referred to as 'correction coordinate system'. The weighting coefficients $\xi_C(d_C)$, and $\eta_C(d_C)$ related to the dot percent $d_C$ of cyan represent positions of the reference points on a cyan axis $A_C$ in the correction coordinate system. Here $\eta_C(d_C)$ corresponds to the distance from the origin of the cyan axis $A_C$ (point corresponding to the dot percent=0%) to a reference point (open square) and $\xi_C(d_C)$ corresponds to the distance from the reference point (open square) to the terminal point of the cyan axis $A_C$ (point corresponding to the dot percent=100%). The sum of the weighting coefficients $\xi_C(d_C)$ and $\eta_C(d_C)$ may not be equal to 1.0 but would be close to 1.0. This is also the case with a magenta axis $A_M$. As readily understandable, Equation (10) determines the reflection coefficient $Sb(d_{C/M},\lambda)$ at the target point (closed square) by interpolating the reflection coefficients at the reference points (open squares) in the correction coordinate system of FIG. 16(D).

The reflection coefficients at the reference points (open squares) in FIG. 16(D) can be determined respectively according to the method of determining reflection coefficients for the primary color discussed above. The reflection coefficient at a target point (closed square) of arbitrary dot percents $d_{C/M}$ can thus be determined according to Equation (10) if the variations in weighting coefficients $\xi_M(d_M)$, $\eta_M(d_M)$, $\xi_C(d_C)$, and $\eta_C(d_C)$ are determined in advance (FIGS. 16(B) and 16(C)).

Like the determination of the weighting coefficients $\alpha$, $\beta$, and $\gamma$ for the primary color, the variations in weighting coefficients $\xi_M(d_M)$, $\eta_M(d_M)$, $\xi_C(d_C)$, and $\eta_C(d_C)$ are determined in the following manner. Equations (23) and (24a)–(24c), which are similar to Equations (20) and (21a)–(21c), were written using the matrices:

$$V_{org\#}=K_{\xi\eta}\cdot V_{prim\#} \tag{23}$$

where $$V_{org\#}=(Sb(d_k,\lambda))=\begin{pmatrix} Sb(d_k,\lambda\text{min}) \\ \cdots \\ Sb(d_k,\lambda\text{max}) \end{pmatrix} \tag{24a}$$

$$K_{\xi\eta}=(\xi_k(d_k)\eta_k(d_k)) \tag{24b}$$

$$V_{prim\#}=\begin{pmatrix} Sb(d_k=0\%,\lambda) \\ Sb(d_k=100\%,\lambda) \end{pmatrix}=\begin{pmatrix} Sb(0\%,\lambda_{\min}) & \cdots & Sb(0\%,\lambda_{\max}) \\ Sb(100\%,\lambda_{\min}) & \cdots & Sb(100\%,\lambda_{\max}) \end{pmatrix} \tag{24c}$$

As shown in Equations (24a)–(24c), the matrix Vorg# represents the value of the diffuse reflection coefficient $Sb(d_k,\lambda)$ with respect to each wavelength ($\lambda$min to $\lambda$max) in the wavelength range of visible rays at an arbitrary dot percent $d_k$ (the subscript k represents a certain kind of ink). The matrix $K_{\xi\eta}$ in Equations (23) and (24a)–(24c) represents the weighting coefficients $\xi_k(d_k)$ and $\eta_k(d_k)$. The matrix Vprim# represents the values of the reference diffuse reflection coefficients $Sb(0\%,\lambda)$ and $Sb(100\%,\lambda)$ at 0% and 100% with respect to each wavelength ($\lambda$min to $\lambda$max). By way of example, when the wavelength $\lambda$ of visible rays is divided into 60 wavelength domains, Equation (23) corresponds to 60 simultaneous equations.

Equations (23) and (24a)–(24c) are set for each ink which is a constituent of a target secondary color. Among the four sides constituting the two-dimensional color space of FIG. 16(A), for example, Equations (23) and (24a)–(24c) are set independently on the side of magenta=0% (cyan axis) $A_C$ (in this case, the subscript k represents cyan) and on the side of cyan=0% (magenta axis) $A_M$ (in this case, the subscript k represents magenta). In accordance with a concrete procedure, when the matrix $K_{\xi\eta}$ is determined according to Equation (25) on the respective sides, eleven sets of weighting coefficients $\xi_k(d_k)$ and $\eta_k(d_k)$ (d=0%, 10%, . . . , 100%) are obtained.

$$K_{\xi\eta}=(\xi_k(d_k)\ \eta_M(d_k))=V_{org\#}\cdot(V_{prim\#})^{-1} \tag{25}$$

FIGS. 16(B) and 16(C) show variations in weighting coefficients $\xi_k(d_k)$ and $\eta_k(d_k)$ thus obtained.

The weighting coefficients $\xi_k(d_k)$ and $\eta_k(d_k)$ obtained for the diffuse reflection coefficient Sb may be also used for the specular reflection coefficient Ss. The weighting coefficients $\xi_k(d_k)$ and $\eta_k(d_k)$ for the specular reflection coefficient Ss may alternatively be determined independently of those for the diffuse reflection coefficient.

In this manner, the diffuse reflection coefficient Sb for the secondary color of an arbitrary dot percent can be determined according to Equation (10) once the weighting coefficients $\xi_k(d_k)$ and $\eta_k(d_k)$ for each ink of the target secondary color are determined in advance. The specular reflection coefficient Ss can be determined in a similar way. Substitution of these reflection coefficients Sb and Ss into Equation (4) enables determination of the illuminance spectrum I for the secondary color and calculation of color data X, Y, and Z thereof.

Figure 17:
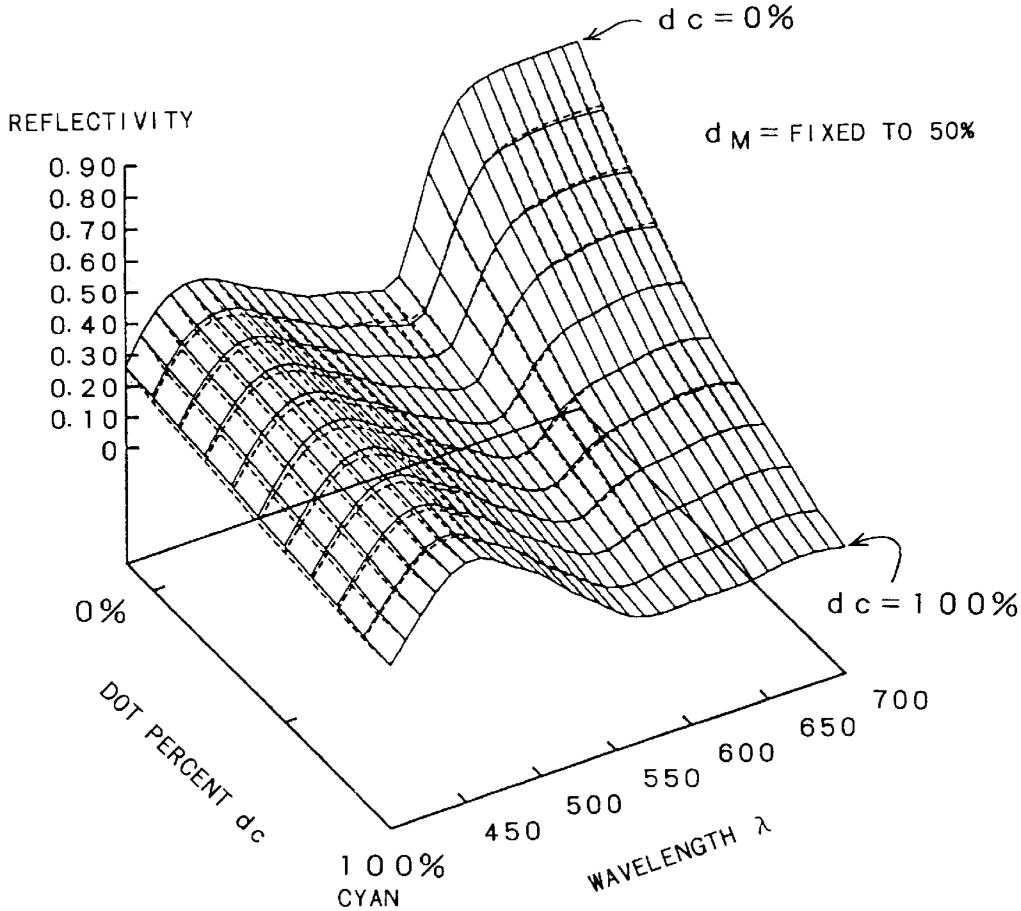
FIG. 17 is a graph showing comparison between the measured values of the diffuse reflection component Sb(d,λ) cos θ regarding the secondary color (shown by the solid lines) and the results of simulation according to Equation 13 (shown by the broken lines)

FIG. 17 is a graph showing comparison between the measured values of the diffuse reflection component $Sb(d,\lambda)\cos\theta$ regarding the secondary color (shown by the solid lines) and the results of simulation according to Equation (10) (shown by the broken lines). FIG. 17 shows the results regarding the secondary color, in which the dot percent $d_M$ of magenta is fixed to 50% while the dot percent $d_C$ of cyan varies from 0% to 100% by every 10%. The solid lines substantially coincide with the broken lines. This shows that the measured values agree well with the results of simulation. The measured values of the specular reflection component also agree well with the result of simulation.

F. Method of Determining Reflection Coefficients for Secondary Color with Higher Precision FIG. 18 shows a method of determining the reflection coefficients for the secondary color with the higher precision. In order to determine the reflection coefficient for the target secondary color (closed square) more precisely, reflection coefficients $Sb(d_{C/0},\lambda)$, $Sb(d_{C/100},\lambda)$, $Sb(d_{0/M},\lambda)$, and $Sb(d_{100/M},\lambda)$ are determined at the reference points (open squares which are located by projecting the target color on the four sides $A_{C1}$, $A_{C2}$, $A_{M1}$, and $A_{M2}$ constituting the periphery of the two-dimensional color space including the target color, according to the method of determining reflection coefficients for the primary color discussed above. The weighting coefficients α, β, and γ are determined independently for each of the four sides $A_{C1}$, $A_{C2}$, $A_{M1}$, and $A_{M2}$ according to Equations (20) to (22) given above. Variations as shown in FIG. 14 are accordingly obtained for the four sets of the weighting coefficients α, β, and γ with respect to the four sides $A_{C1}$, $A_{C2}$, $A_{M1}$, and $A_{M2}$.

Figure 18A:
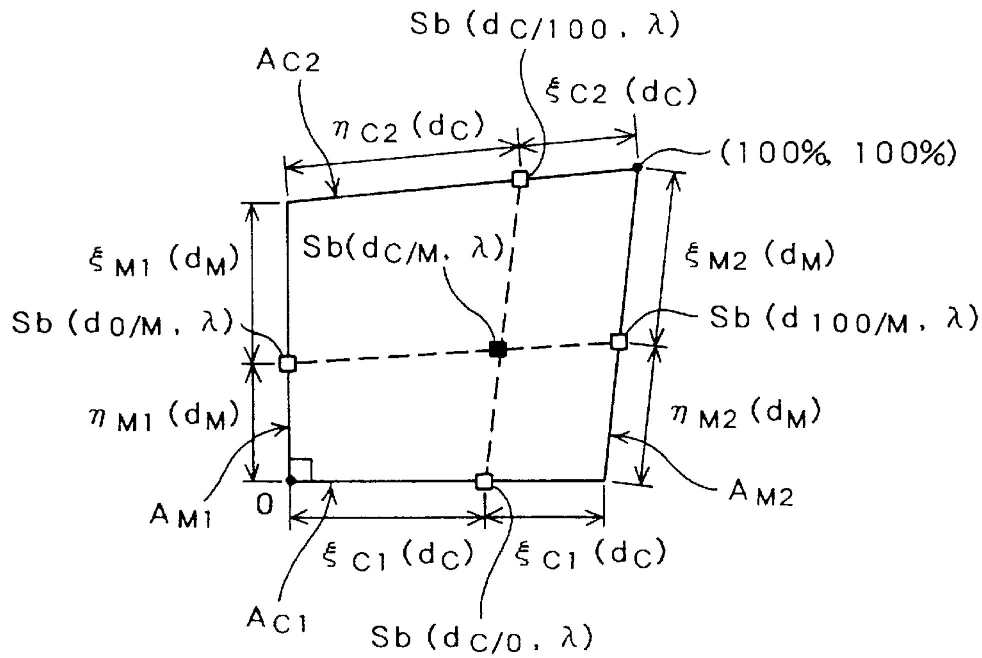
FIGS. 18(A) and 18(B) show a method of determining the reflection coefficients for the secondary color with the higher precision.

The weighting coefficients $\xi_k(d_k)$ and $\eta_k(d_k)$ (k represents each ink) used in Equation (10) are determined according to Equations (23) through (25) for each of the four sides $A_{C1}$, $A_{C2}$, $A_{M1}$, and $A_{M2}$ shown in FIG. 18(A). FIG. 18(A) shows a correction coordinate system expressed by the four sets of weighting functions thus determined. The length of each of the four sides $A_{C1}$, $A_{C2}$, $A_{M1}$, and $A_{M2}$ is equal to the sum of each set of weighting coefficients (ξ+η). The side $A_{C1}$ having magenta fixed to 0% (cyan axis) is perpendicular to the side $A_{M1}$ having cyan fixed to 0% (magenta axis). The shape of the rectangle defined by these four sides $A_{C1}$, $A_{C2}$, $A_{M1}$, and $A_{M2}$ is accordingly determined unequivocally.

Figure 18B:
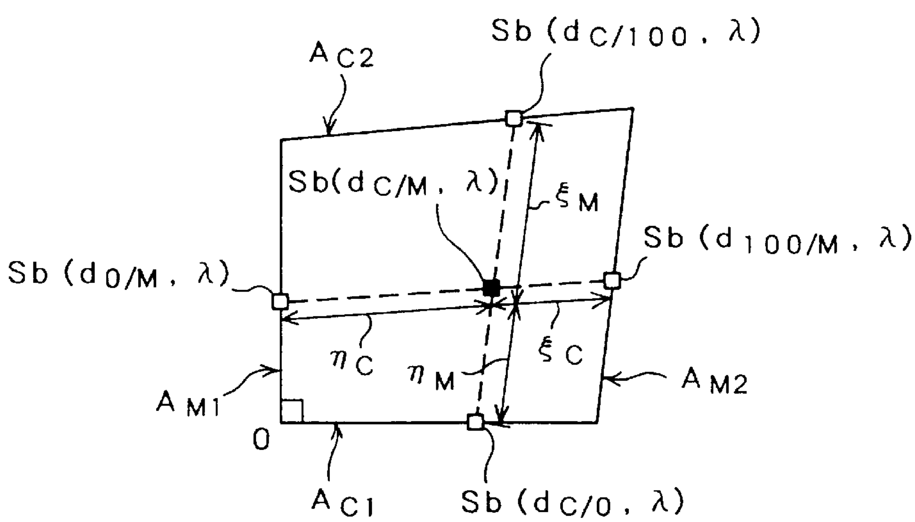

The weighting coefficients $\xi_M$, $\eta_M$, $\xi_C$ and $\eta_C$ shown in FIG. 18(B) are used in Equation (10) in order to determine the reflection coefficients at the target point (closed square) in the correction coordinate system shown in FIG. 18(A). Here $\xi_M$ represents the distance from the reference point (open square) on the side $A_{C2}$ to the target point (closed square), and $\eta_M$ represents the distance from the reference point (open square) on the side $A_{C1}$ to the target point (closed square). $\xi_C$ and $\eta_C$ have the similar meanings. The positions of the four reference points (open squares) are determined as shown in FIG. 18(A), and the distances $\xi_M$, $\eta_M$, $\xi_C$ and $\eta_C$ shown in FIG. 18(B) can be determined according to the positions of these reference points. In the drawings of FIGS. 18(A) and 18(B), the target point (closed square) is positioned at the intersection of the two line segments which respectively connect the reference points on the opposed sides with each other.

Determination of the weighting coefficients $\xi_M$, $\eta_M$, $\xi_C$ and $\eta_C$ used in Equation (10) as shown in FIG. 18(B) will give the reflection coefficients of the secondary target color with higher precision.

G. Method of Determining Reflection Coefficients for Tertiary Color

Figure 19:
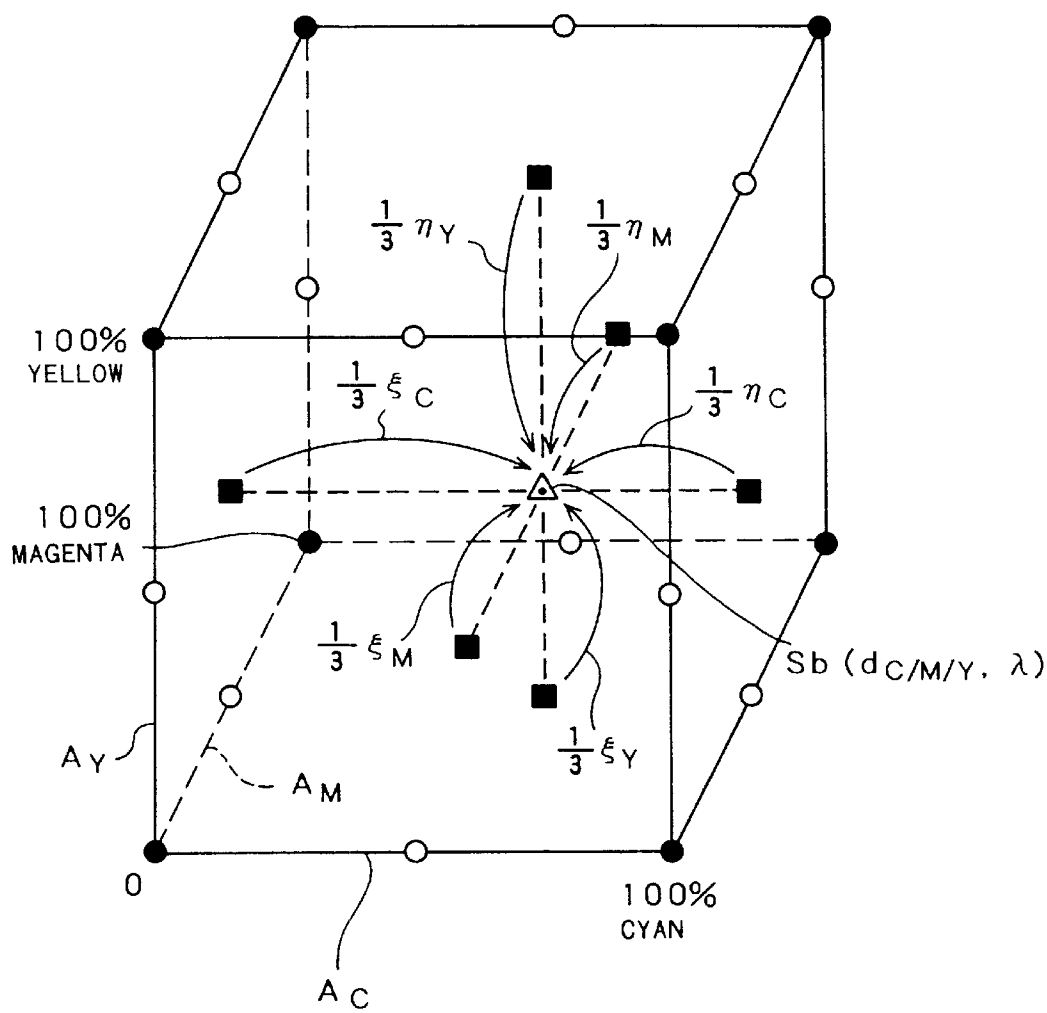
FIG. 19 shows a method of determining the reflection coefficients for the tertiary color.

The diffuse reflection coefficient at arbitrary dot percents for the tertiary color is given by Equation (11) discussed above. FIG. 19 shows a method of determining the reflection coefficients for the tertiary color according to Equation (11). The diffuse reflection coefficient $Sb(d_{C/M/Y},\lambda)$ for the tertiary color is given as a linear combination of the reflection coefficients at the six reference points (dosed squares) which are located by projecting a target point (an open triangle) on six faces constituting the periphery of a three-dimensional color space including the target point. The reflection coefficients at the six reference points (closed squares) in FIG. 19 are determined respectively according to the method of determining the reflection coefficients for the secondary color discussed in FIG. 16 or FIG. 18. The weighting coefficients $\xi_M$, $\eta_M$, $\xi_C$, $\eta_C$, $\xi_Y$ and $\eta_Y$ used in Equation (11) are identical with those used in the determination of the reflection coefficients for the secondary color. The weighting coefficients determined according to Equations (23) through (25) on the side $A_C$ (cyan axis), where magenta and yellow both equal to 0%, are also applicable for the weighting coefficients $\xi_C$ and $\eta_C$ regarding cyan. In a similar manner, the weighting coefficients determined on the side $A_M$ (magenta axis) are applicable for the weighting coefficients $\xi_M$ and $\eta_M$ regarding magenta, and the weighting coefficients determined on the side $A_Y$ (yellow axs) are applicable for the weighting coefficients $\xi_Y$ and $\eta_Y$ regarding yellow.

In this manner, the diffuse reflection coefficient Sb for the tertiary color of arbitrary dot percents can be determined according to Equation (11) once the weighting coefficients $\xi_k(d_k)$ and $\eta_k(d_k)$, where k represents each ink, is determined for each ink of the target tertiary color. The specular reflection coefficient Ss can be determined in a similar way. Substitution of these reflection coefficients Sb and Ss into Equation (4) enables determination of the illuminance spectrum I for the tertiary color and calculation of color data X, Y, and Z thereof.

H. Method of Determining Reflection Coefficients for Quaternary and Higher-order Colors The method of determining the reflection coefficients for the tertiary color discussed above is readily expandable to the quaternary or higher-order color. The reflection coefficients for the quaternary color are determined according to Equation (12) discussed above. The reflection coefficients included in the right-hand side of Equation (12) are determined according to the method of determining the reflection coefficients for the tertiary color. It is required to previously determine the weighting coefficients $\xi_k(d_k)$ and $\eta_k(d_k)$, where k represents each kind of ink, for each ink of the quaternary color according to the flowchart of FIG. 6. The weighting coefficients may alternatively be determined according to Equations (23) through (25), based on the results of measurement on the spectrum of the gradation of the primary color including only each ink.

In general, the reflection coefficients for an n-order color (n is an integer w of not less than 2) are determined according to Equations (13) and (14) discussed above. It is required to previously determine the weighting coefficients $\xi_k(d_k)$ and $\eta_k(d_k)$ (k represents each kind of ink) for each ink of the n-order color according to the flowchart of FIG. 6. The weighting coefficients may alternatively be determined according to Equations (23) through (25), based on the results of measurement on the spectrum of the gradation of the primary color including only each ink.

I. Simulation of Color Print

Referring back to the flowchart of FIG. 6, steps S6 and S7 show a process of reproducing a print with an output device, based on the reference reflection coefficients Sb and Ss and the weighting coefficients ξ, η, α, β, and γ obtained by the processing of steps S1 through S4. At step S6, a rendering operation by computer graphics is carried out to generate color data for reproducing the colors of a color print.

Figure 20:
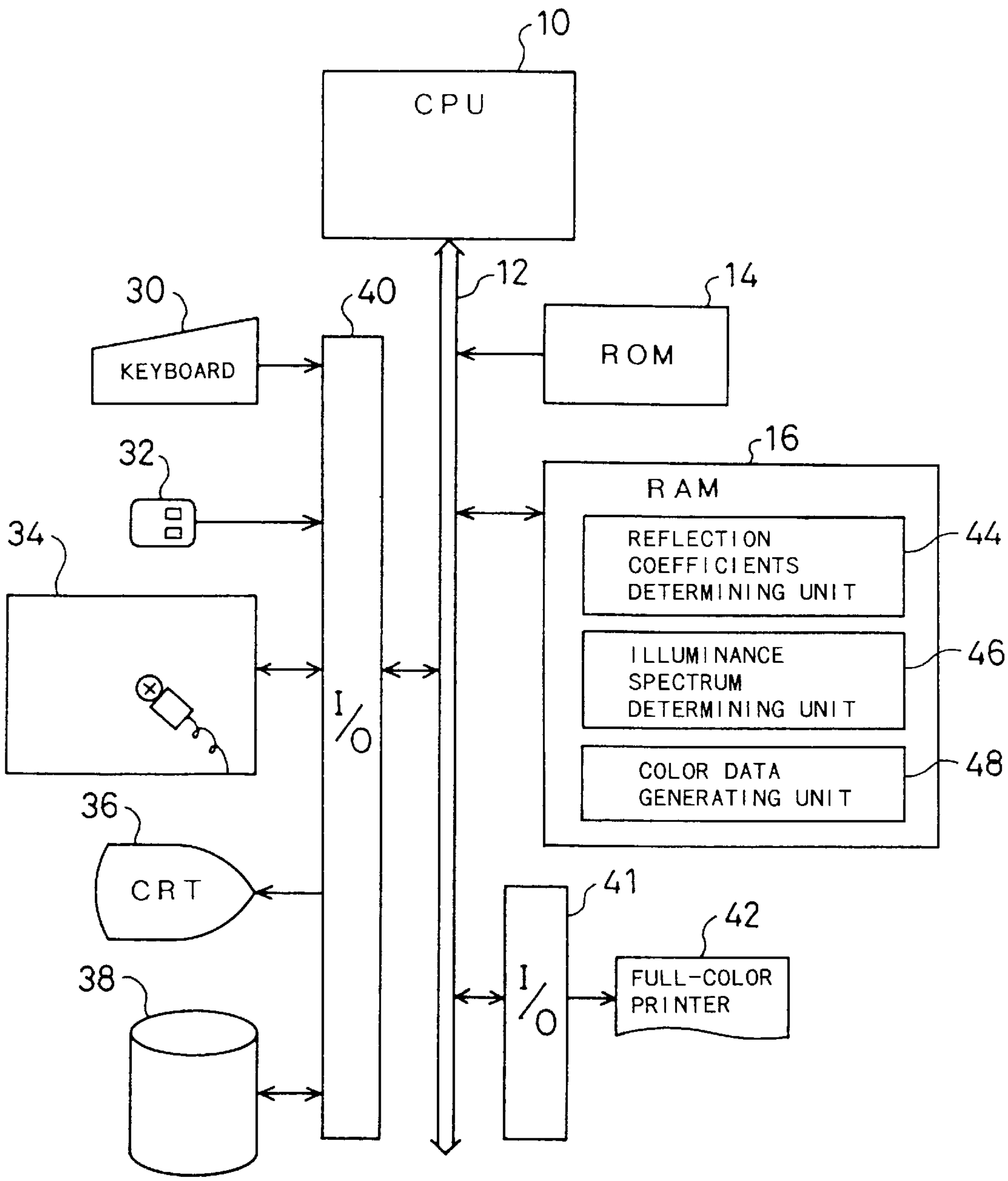
FIG. 20 is a block diagram illustrating a computer system for reproducing colors of a print arranged in a three-dimensional space, as an embodiment of the present invention.

FIG. 20 is a block diagram illustrating a computer system for reproducing a color print arranged in a three-dimensional space, as an embodiment of the present invention. The computer system includes CPU 10 and a bus line 12. ROM 14 and RAM 16 are connected to the bus line 12. A keyboard 30, a mouse 32, a digitizer 34, a color CRT 36, a magnetic disk 38, and a full-color printer 42 are also connected to the bus line 12 via input/output interfaces 40 and 41.

The RAM 16 stores applications programs that implement functions of: a reflection coefficients determining unit 44, a illuminance spectrum determining unit 46, and a color data generating unit 48. The reflection coefficients determining unit 44 determines reflection coefficients Sb and Ss according to Equations (8) through (14) discussed above. The illuminance spectrum determining unit 46 determines the illuminance spectrum I(d,θ,ρ,λ) according to Equation (4) given above. The color data generating unit 48 obtains three stimulus values X(d), Y(d), and Z(d) according to Equations (5a)–(5c) given above, and converts the stimulus values to color data corresponding to the colorimetric system in the output device. The CPU 10 executes the applications programs stored in the RAM 16 to implement the functions of the respective units. The computer system also stores an applications program for carrying out a rendering operation to reproduce a color print arranged in a three-dimensional space on a color display.

Figure 21:
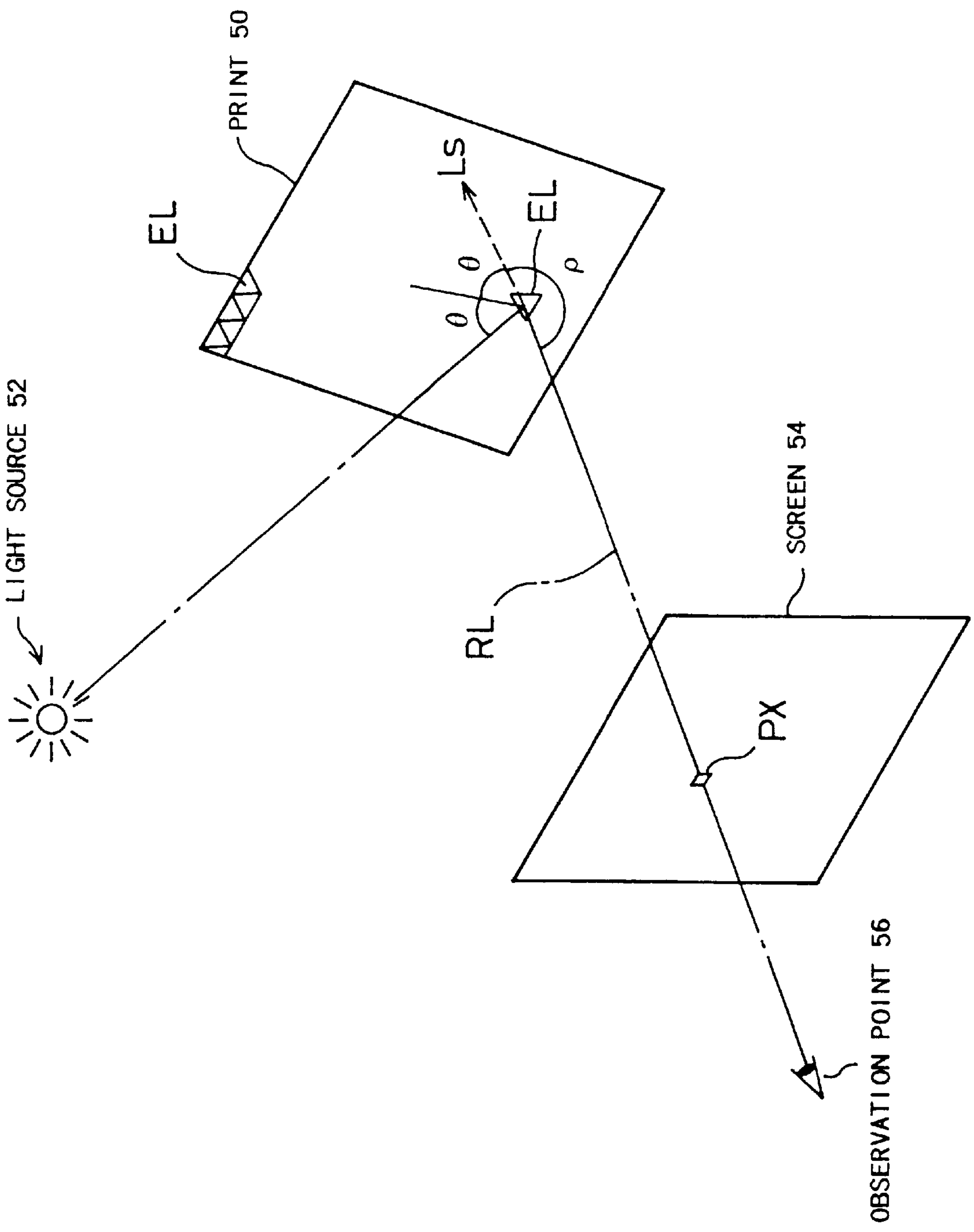
FIG. 21 shows a three-dimensional arrangement for reproducing the colors of a print by a ray tracing method.

FIG. 21 shows a three-dimensional arrangement of a print 50, a light source 52, a screen 54 on the CRT, and an observation point, which are used in a ray tracing method. The ray tracing method is a known rendering technique in three-dimensional computer graphics. The ray tracing method traces a line of sight RL, which passes through each pixel PX on the screen 54 and the observation point 56, inversely from the observation point 56 to the light source, thereby determining color data (RGB data) at each pixel PX on the screen 54. The print 50 is divided into a plurality of small polygons EL in advance. Each small polygon EL corresponds to a target point in the claimed invention. Although each small polygon EL is a plane, the whole print 50 may be modeled to have a three-dimensional curvature. The angle of incidence θ and the angle of deviation ρ are defined in a specific small polygon EL existing at the intersection of the line of sight RL and the print 50 as shown in FIG. 21.

In the process of ray tracing, the reflection coefficients determining unit 44 determines the reflection coefficients Sb(d, λ) and Ss(d, λ) according to Equations (8) through (14) discussed above. The illuminance spectrum determining unit 46 determines the illuminance spectrum I(d,θ,ρ,λ) according to Equation (4) given above. The color data generating unit 48 integrates the illuminance spectrum I(d, θ,ρ,λ) thus obtained according to Equations (5a)–(5c) given above to determine three stimulus values X, Y, and Z.

At step S7 in the flowchart of FIG. 6, the color data generating unit 48 converts the three stimulus values thus obtained to RGB data and allocate the RGB data to the pixels on the color CRT 36. In accordance with a concrete procedure, RGB data are stored at each pixel position in a frame memory. A color print is displayed on the color CRT 36 according to the RGB data in the frame memory. Conversion of the XYZ colorimetric system to the RGB colorimetric system depends upon the characteristics of the output device. Using conversion equations corresponding to the output device thereby enables the accurate color reproduction in the expressible range of colors in the output device.

As discussed above, in the process of determining reflection coefficients for an n-order target color (n is an integer of not less than 2), the above embodiment projects the coordinate point of the target color on 2n pieces of (n−1)-order color spaces constituting the periphery of an n-dimensional color space including the n-order color and thereby sets 2n pieces of reference points (pseudo-(n−1)-order colors). Each reflection coefficient for the n-order target color is given as a linear combination of the reflection coefficients at the 2n pieces of reference points (Equations (13) and (14)). Repetition of this procedure for n=2 to N determines the reflection coefficients for the N-order color, where N is an integer of not less than 3. This method determines the reflection coefficients Sb and Ss for an arbitrary N-order target color with high precision. These reflection coefficients Sb and Ss can be used to determine color data regarding the N-order color (for example, XYZ or RGB data). This accordingly enables a print of the N-order color having an arbitrary dot percent to be reproduced with high precision on a display.

The present invention is not restricted to the above embodiment or its applications, but there may be many modifications, changes, and alterations without departing from the scope or spirit of the main characteristics of the present invention. Some examples of possible modification are given below.

Figure 22:
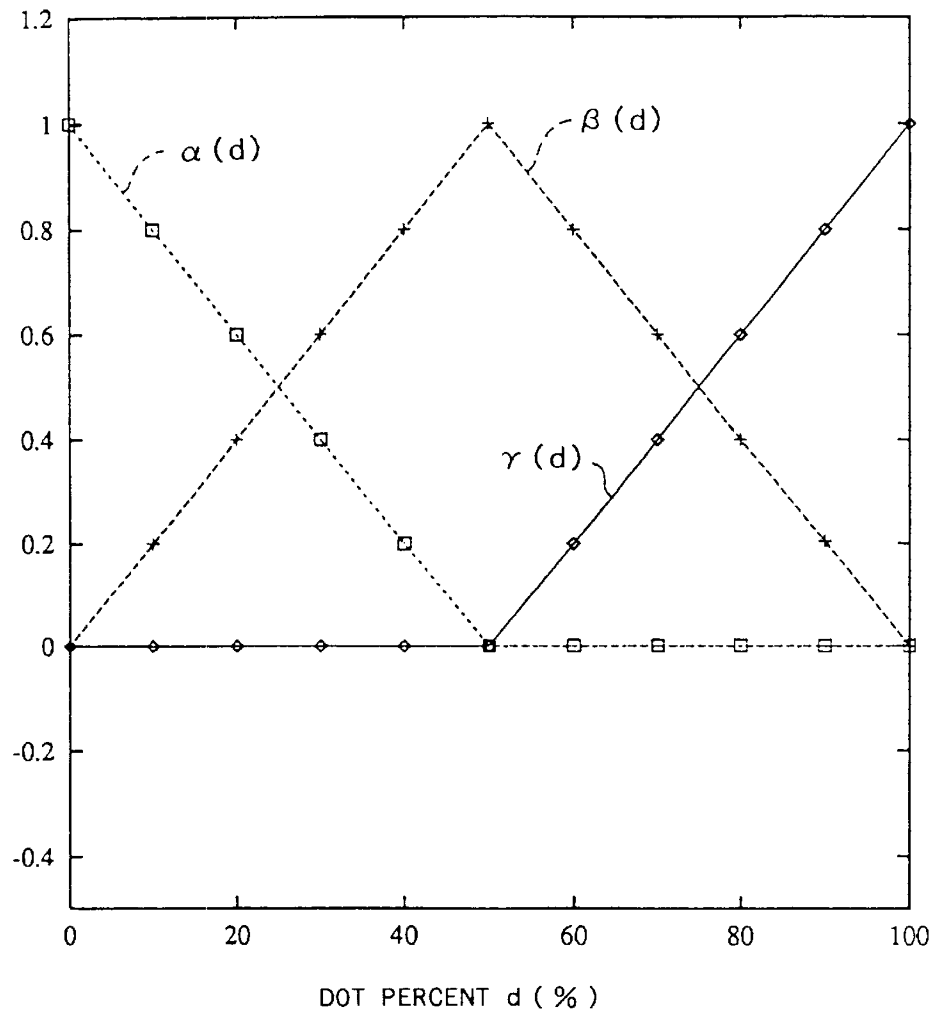
FIG. 22 is a graph showing simplified variations in weighting coefficients α(d), β(d), and γ(d).

FIG. 22 is a graph showing simplified variations in weighting coefficients α(d), β(d), and γ(d) shown in FIG. 14. Referring to FIG. 22, in the range of the dot percent from 0%to 50%, the first weighting coefficient α(d) linearly decreases from 1.0 to 0, while the second weighting coefficient β(d) linearly increases from 0 to 1.0. In the range of the dot percent from 50% to 100%, on the other hand, the second weighting coefficient β(d) linearly decreases from 1.0 to 0, while the third weighting coefficient γ(d) linearly increases from 0 to 1.0. In other words, in the range of the dot percent from 0% to 50%, the reflection coefficient at an arbitrary dot percent d (Equation (8)) is obtained by linear interpolation of the first and the second reference reflection coefficients Sb(0%,λ) and Sb(50%,λ). In the range of the dot percent from 50% to 100%, on the other hand, the reflection coefficient at the arbitrary dot percent d is obtained by linear interpolation of the second and the third reference reflection coefficients Sb(50%,λ) and Sb(100%,λ).

The graph of FIG. 22 is similar to the graph of FIG. 14 obtained in the above embodiment. Simulation of a print can thus be carried out with a rather high accuracy using the weighting coefficients of FIG. 22. In case that the graph of FIG. 22 is used, the processing of step S4 may be omitted from the flowchart of FIG. 6. In this case, the dot percent $d_k$ itself can be used as the weighting coefficient $\eta_k(d_k)$ for the determination of the reflection coefficients for the secondary or the higher-order color, and $(1-d_k)$ as the weighting coefficient $\xi_k(d_k)$.

Equations (8) and (9) may be replaced with other Equations to determine the reflection coefficients Sb and Ss at an arbitrary dot percent d of the primary color. Generalization of Equations (8) and (9) gives Equations (26a) and (26b):

$$Sb(d_k,\lambda)=\sum_{i=1}^{m_1} a_i(d_k(i))\cdot Sb(d_k(i),\lambda) \tag{26a}$$

$$Ss(d_k,\lambda)=\sum_{j=1}^{m_2} b_j(d_k(j))\cdot Ss(d_k(j),\lambda) \tag{26b}$$

wherein $a_i(d_k(i))$ denotes a weighting coefficient at a dot percent $d_k$ with respect to a reference diffuse reflection coefficient $Sb(d_k(i),\lambda)$ related to an i-th reference dot percent $d_k(i)$ for a k-th ink; $b_j(d_k(j))$ denotes a weighting coefficient at the dot percent $d_k$ with respect to a reference specular reflection coefficient $Ss(d_k(j),\lambda)$ related to a j-th reference dot percent $d_k(j)$; and $m_1$ and $m_2$ are integers of not less than 2. The reflection coefficients Sb and Ss at an arbitrary dot percent $d_k$ are generally expressed as a linear combination of plural reference reflection coefficients, respectively. In case that $m_1=m_2=3$ in Equations (26a) and (26b), the weighting coefficient $a_i(d_k(i))$ (i=1 to 3) corresponds to the weighting coefficients α(d), β(d), and γ(d) in Equation (8), and the weighting coefficient $b_j(d_k(j))$ (j=1 to 3) corresponds to the weighting coefficients α(d), β(d), and γ(d) in Equation (9). Although it is preferable that at least either $m_1$ or $m_2$ has the value of not less than 3, both $m_1$ and $m_2$ may be equal to 2.

As for the black ink, the simultaneous equations given by Equations (20) and (21a)–(21c) may have a linear dependence with each other, and therefore the weighting coefficients α, β, and γ are not obtained according to Equation (22). Similarly, the simultaneous equations given by Equations (23) and (24a)–(24c) may have a linear dependence with each other, and the weighting coefficients $\xi_k$ and $\eta_k$ are not obtained according to Equation (25). The linear dependence of the simultaneous equations given by Equations (20) and (21a)–(21c) implies that the diffuse reflection components for the respective color chips of the primary gradation have similar shapes; that is, the eleven curves in FIG. 12 have similar shapes. In this case, the weighting coefficients shown in FIG. 22 may be used as the weighting coefficients $\alpha$, $\beta$, and $\gamma$. An effective dot percent $d_{net}$ calculated according to the well-known Marley-Davis's Equation may be applied for the weighting coefficient $\eta_k$, which is used to determine the reflection coefficients for the high-order color, while the other weighting finction $\xi_k$ is given as $(1-d_{net})$.

The above embodiment successively determines the reflection coefficients for the primary color to the N-order color in a stepwise manner. Alternatively, the reflection coefficients for the N-order color may be determined directly. For example, the equation used for directly determining the diffuse reflection coefficient Sb for the tertiary color is obtained by substituting Equation (8) into Equation (10) and further substituting Equation (10) into Equation (11). The equation thus obtained represents a linear combination of the reference reflection coefficients at end points (closed circles) and midpoints (open circles) on the twelve sides constituting the periphery of the three-dimensional color solid shown in FIG. 3(C).

In general, the equation used for directly determining the reflection coefficient for the N-order color represents a linear combination of the reference reflection coefficients on the $N\times 2^{(N-1)}$ sides constituting the periphery of the N-dimensional color space including the N-order color. It is preferable that the reference reflection coefficients on each side include at least the values at both end points of each side (that is, points having dot percent of 0% and 100% regarding a specific ink). It is further preferable that a value on a substantial center of each side (that is, a point having dot percent of 50% regarding the specific ink) is used as a reference reflection coefficient.

In the above embodiment, the weighting coefficients $\xi_k$ and $\eta_k$ are calculated for each ink. Instead, a set of the weighting coefficients $\xi_k$ and $\eta_k$ obtained for a certain kind of ink may be applied for the other inks. This is also the case with the weighting coefficients $\alpha$, $\beta$, and $\gamma$ for the primary color. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of simulating a color print of an N-order color, where N is an integer of at least 2, arranged in a three-dimensional space by rendering said color print and thereby reproducing said color print with an output device, said method using an illuminance spectrum I of a reflected light beam, which is observed at a predetermined observation point when a target point on said color print is irradiated with a light beam having a predetermined luminance spectrum $\phi$, said illuminance spectrum I being given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

where $d_{1-N}$ denotes a dot percent of each of N different color inks at said target point, $\lambda$ denotes a wavelength of the light beam, $Sb(d_{1-N},\lambda)$ and $Ss(d_{1-N},\lambda)$ respectively denote a first reflection coefficient and a second reflection coefficient for the N-order color, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at said observation point, said method comprising the steps of:

(a) specifying a plurality of reference colors on each of $N\times 2^{(N-1)}$ sides that constitute an N-dimensional color space including a target color of said target point, said target color being the N-order color, and providing first and second reference reflection coefficients for each of said plurality of reference colors; determining a first reflection coefficient Sb in said Equation by a linear combination of a plurality of first reference reflection coefficients preset for said plurality of reference colors, and determining a second reflection coefficient Ss by a linear combination of a plurality of second reference reflection coefficients preset for said plurality of reference colors;

(b) determining said illuminance spectrum I of the reflected light beam according to said Equation using said first reflection coefficient Sb and said second reflection coefficient Ss determined in said step (a); and (c) obtaining color data representing said target color in a colorimetric system suitable for said output device from said illuminance spectrum I of the reflected light beam.

2. A method in accordance with claim 1, wherein said plurality of reference colors on each of said $N\times 2^{(N-1)}$ sides include at least colors at end points of each side.

3. A method in accordance with claim 2, wherein said plurality of reference colors on each of said $N\times 2^{(N-1)}$ sides further include a color at a substantial center of each side.

4. A method in accordance with claim 1, wherein said step (a) comprises the steps of:

(1) specifying 2n pieces of pseudo-(n−1)-order colors by projecting a coordinate point of an n-order color, where n is an integer of at least 2 and not greater than N, on 2n pieces of (n−1)-order color spaces which constitute the periphery of an n-order color space including said n-order color;

determining said first reflection coefficient Sb with respect to said n-order color by a linear combination of first reflection coefficients with respect to said 2n pieces of pseudo-(n−1)-order colors, and determining said second reflection coefficient Ss with respect to said n-order color by a linear combination of second reflection coefficients with respect to said 2n pieces of pseudo-(n−1)-order colors; and (2) repeating said step (1) while changing said n from 2 to N, thereby obtaining said first reflection coefficient Sb and said second reflection coefficient Ss with respect to said N-order color.

5. A method in accordance with claim 4, wherein said step (a) further comprises the steps of:

specifying $N\times 2^{(N-1)}$ pieces of pseudo-primary colors by projecting a coordinate point of said N-order target color on said $N\times 2^{(N-1)}$ sides constituting said N-order color space;

determining a first reflection coefficient Sb with respect to each of said $N\times 2^{(N-1)}$ pieces of pseudo-primary colors by a linear combination of said plurality of first reference reflection coefficients with respect to said reference colors on each of said $N\times 2^{(N-1)}$ sides; and determining a second reflection coefficient Ss with respect to each of said $N\times 2^{(N-1)}$ pieces of pseudo-primary colors by a linear combination of said plurality of second reference reflection coefficients with respect to said reference colors on each of said $N\times2^{(N-1)}$ sides.

6. A method in accordance with claim 1, wherein said characteristics fb(θ) and fs(ρ) are give by:

$fb(\theta)=\cos\theta$ $fs(\rho)=e^{-\sigma\rho^2}$ where σ is a constant.

7. An apparatus for simulating a color print of an N-order color, where N is an integer of at least 2, arranged in a three-dimensional space by rendering said color print to reproduce said color print with an output device, said apparatus using an illuminance spectrum I of a reflected light beam, which is observed at a predetermined observation point when a target point on said color print is irradiated with a light beam having a predetermined luminance spectrum φ, said illuminance spectrum I being given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

where $d_{1-N}$ denotes a dot percent of each of N different color inks at said target point, λ denotes a wavelength of the light beam, $Sb(d_{1-N},\lambda)$ and $Ss(d_{1-N},\lambda)$ respectively denote a first reflection coefficient and a second reflection coefficient for the N-order color, θ denotes an angle of reflection, fb(θ) denotes a θ-dependent characteristic, ρ denotes an angle of deviation of an observing direction from a reflecting direction of the light beam, fs(ρ) denotes a ρ-dependent characteristic, and Ie(λ) represents an illuminance spectrum of ambient light observed at said observation point, said apparatus comprising:

reflection coefficients determining means for (i) specifying a plurality of reference colors on each of $N\times2^{(N-1)}$ sides that constitute an N-dimensional color space including a target color of said target point, said target color being the N-order color, and providing first and second reference reflection coefficients for each of said plurality of reference colors; (ii) determining a first reflection coefficient Sb in said Equation by a linear combination of a plurality of first reference reflection coefficients preset for said plurality of reference colors, and (iii) determining a second reflection coefficient Ss by a linear combination of a plurality of second reference reflection coefficients preset for said plurality of reference colors;

means for determining said illuminance spectrum I of the reflected light beam according to said Equation using said first reflection coefficient Sb and said second reflection coefficient Ss determined by said reflection coefficients determining means; and means for obtaining color data representing said target color in a colorimetric system suitable for said output device from said illuminance spectrum I of the reflected light beam.

8. An apparatus in accordance with claim 7, wherein said plurality of reference colors on each of said $N\times2^{(N-1)}$ sides include at least colors at end points of each side.

9. An apparatus in accordance with claim 8, wherein said plurality of reference colors on each of said $N\times2^{(N-1)}$ sides further include a color at a substantial center of each side.

10. An apparatus in accordance with claim 7, wherein said reflection coefficients determining means comprise:

first means for specifying 2n pieces of pseudo-(n−1)-order colors by projecting a coordinate point of an n-order color, where n is an integer of at least 2 and not greater than N, on 2n pieces of (n−1)-order color spaces which constitute the periphery of an n-order color space including said n-order color;

second means for determining said first reflection coefficient Sb with respect to said n-order color by alinear combination of first reflection coefficients with respect to said 2n pieces of pseudo-(n−1)-order colors, and third means for determining said second reflection coefficient Ss with respect to said n-order color by a linear combination of second reflection coefficients with respect to said 2n pieces of pseudo-(n−1)-order colors; and wherein said determining by said second means and said determining by said third means are repeated while changing said n from 2 to N, thereby obtaining said first reflection coefficient Sb and said second reflection coefficient Ss with respect to said N-order color.

11. An apparatus in accordance with claim 10, wherein said reflection coefficients determining means further comprises:

means for specifying $N\times2^{(N-1)}$ pieces of pseudo-primary colors by projecting a coordinate point of said N-order target color on said $N\times2^{(N-1)}$ sides constituting said N-order color space;

means for determining a first reflection coefficient Sb with respect to each of said $N\times2^{(N-1)}$ pieces of pseudo-primary colors by a linear combination of said plurality of first reference reflection coefficients with respect to said reference colors on each of said $N\times2^{(N-1)}$ sides; and means for determining a second reflection coefficient Ss with respect to each of said $N\times2^{(N-1)}$ pieces of pseudo-primary colors by a linear combination of said plurality of second reference reflection coefficients with respect to said reference colors on each of said $N\times2^{(N-1)}$ sides.

12. An apparatus in accordance with claim 7, wherein said characteristics fb(θ) and fs(ρ) are give by:

$fb(\theta)=\cos\theta$ $fs(\rho)=e^{-\sigma\rho^2}$ where σ is a constant.

13. A computer program product for simulating a color print of an N-order color, where N is an integer of at least 2, arranged in a three-dimensional space by rendering said color print to reproduce said color print with an output device, said computer program product comprising:

a computer readable medium; and a computer program code means stored on said computer readable medium, said computer program code means comprising:

first program code means using an illuminance spectrum I of a reflected light beam, which is observed at a predetermined observation point when a target point on said color print is irradiated with a light beam having a predetermined luminance spectrum φ, said illuminance spectrum I being given by the following Equation:

$$I(d_{1-N},\theta,\rho,\lambda)=\{Sb(d_{1-N},\lambda)\cdot fb(\theta)+Ss(d_{1-N},\lambda)\cdot fs(\rho)\}\cdot\phi(\lambda)+Ie(\lambda)$$

where $d_{1-N}$ denotes a dot percent of each of N different color inks at said target point, λ denotes a wavelength of the light beam, $Sb(d_{1-N},\lambda)$ and $Ss(d_{1-N},\lambda)$ respectively denote a first reflection coefficient and a second reflection coefficient for the N-order color, θ denotes an angle of reflection, fb(θ) denotes a θ-dependent characteristic, ρ denotes an angle of deviation of an observing direction from a reflecting direction of the light beam, fs(ρ) denotes a ρ-dependent characteristic, and Ie(λ) represents an illuminance spectrum of ambient light observed at said observation point; said first program code means causing a computer to specify a plurality of reference colors on each of $N\times2^{(N-1)}$ sides that constitute an N-dimensional color space including a target color of said target point, said target color being the N-order color, and providing first and second reference reflection coefficients for each of said plurality of reference colors; and to determine a first reflection coefficient Sb in said Equation by a linear combination of a plurality of first reference reflection coefficients preset for said plurality of reference colors;

and to determine a second reflection coefficient Ss by a linear combination of a plurality of second reference reflection coefficients preset for said plurality of reference colors;

second program code means for causing the computer to determine said illuminance spectrum I of the reflected light beam according to said Equation using said first reflection coefficient Sb and said second reflection coefficient Ss determined by said reflection coefficients determining means; and third program code means for causing the computer to obtain color data representing said target color in a colorimetric system suitable for said output device from said illuminance spectrum I of the reflected light beam.

* * * * *